United States Patent
Yun et al.

[19]

[11] Patent Number: 5,886,988
[45] Date of Patent: Mar. 23, 1999

[54] CHANNEL ASSIGNMENT AND CALL ADMISSION CONTROL FOR SPATIAL DIVISION MULTIPLE ACCESS COMMUNICATION SYSTEMS

[75] Inventors: Louis C. Yun, Mountain View, Calif.; Björn E. Ottersten, Lidingö, Sweden

[73] Assignee: ArrayComm, Inc., San Jose, Calif.

[21] Appl. No.: 777,598

[22] Filed: Dec. 31, 1996

Related U.S. Application Data

[63] Continuation-in-part of Ser. No. 735,520, Oct. 23, 1996, Pat. No. 5,828,658.

[51] Int. Cl.$^6$ ........................................................ H04Q 7/00
[52] U.S. Cl. ........................................... 370/329; 455/509
[58] Field of Search ..................................... 370/252, 276, 370/277, 310, 328, 329, 331, 332, 333, 334, 341, 431, 465, 468; 455/423, 424, 425, 434, 450, 451, 452, 453, 464, 509, 510, 63, 67.1, 507, 512, 513; 364/574, 572

[56] References Cited

U.S. PATENT DOCUMENTS

| | | | |
|---|---|---|---|
| 5,093,924 | 3/1992 | Toshiyuki et al. | 455/62 |
| 5,260,968 | 11/1993 | Gardner et al. | |
| 5,448,621 | 9/1995 | Knudsen . | |
| 5,475,864 | 12/1995 | Hamabe . | |
| 5,515,378 | 5/1996 | Roy, III et al. | |
| 5,530,917 | 6/1996 | Andersson et al. | 455/450 |
| 5,555,445 | 9/1996 | Booth . | |
| 5,557,657 | 9/1996 | Barnett . | |
| 5,592,490 | 1/1997 | Barratt et al. | |
| 5,603,082 | 2/1997 | Hamabe | 455/63 |
| 5,606,729 | 2/1997 | D'Amico et al. | 455/266.2 |
| 5,726,978 | 3/1998 | Frodigh et al. | 455/63 |

*Primary Examiner*—Huy D. Vu
*Attorney, Agent, or Firm*—Townsend and Townsend and Crew LLP; Henry K. Woodward

[57] ABSTRACT

The methods for channel assignment and channel reassignment are suitable for SDMA systems that accommodate the dynamically adaptive spatial channel conditions and allow for more frequent reuse of conventional channels. Three methods for uplink channel assignment are described: a cost function method, a predictive method, and a hierarchical method. The cost function method computes a cost function for each conventional channel based on a weighted correlation matrix of spatial signatures (vectors) of active subscribers. A spatial channel is created for the selected conventional channel if it is in use. The predictive channel assignment method predicts the uplink received power and interference-plus-noise for each conventional channel. Either the conventional channel with the minimum interference-plus-noise level or the channel with the maximal SINR is selected and a spatial channel is also assigned if the selected channel is in use. The hierarchical method combines the cost function method and the cost function method. The downlink channel assignment method, when not constrained by the uplink channel assignment, assigns a conventional channel to a new connection by estimating the downlink interference-plus-noise level from a subscriber report, spatial signature and weight vector, and computing a predicted downlink received signal level. Three methods for call admission control include: a cost function method, a predictive method, and a load based channel assignment method.

60 Claims, 8 Drawing Sheets

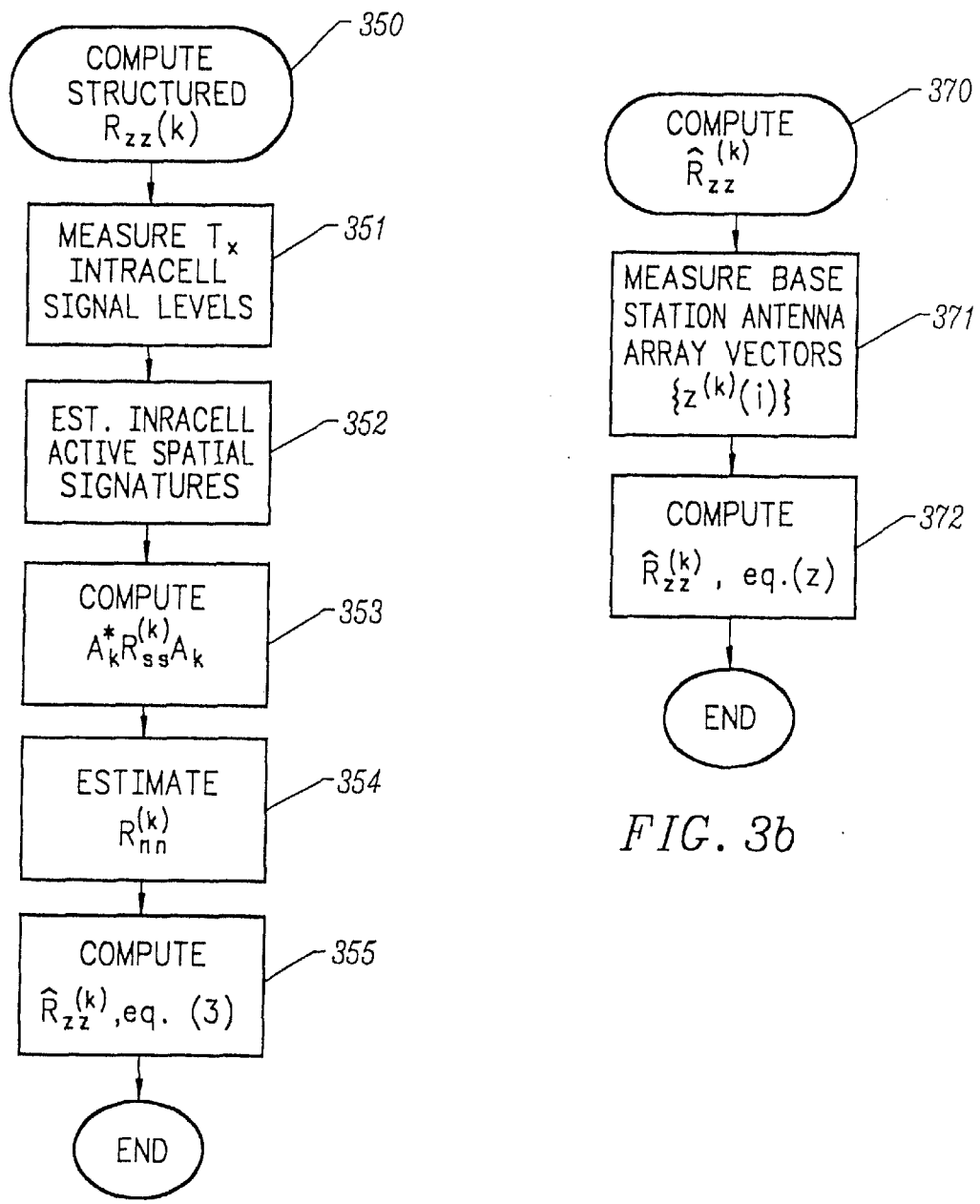

CHANNEL ASSIGNMENT AND CALL ADMISSION CONTROL FOR SPATIAL DIVISION MULTIPLE ACCESS COMMUNICATION SYSTEMS

CROSS-REFERENCE TO RELATED APPLICATION

This application is a continuation-in-part of pending U.S. patent application entitled "Spectrally Efficient High Capacity Wireless Communication Systems with Spatial-Temporal Processing", Ser. No. 08/735,520, filed Oct. 23, 1996, now U.S. Pat. No. 5,828,658.

FIELD OF INVENTION

The present invention relates to wireless communication systems and more specifically to fixed-access or mobile-access wireless networks using spatial division multiple access (SDMA) technology in combination with multiple access systems, such as time domain multiple access (TDMA), frequency division multiple access (FDMA), and/or code division multiple access (CDMA) systems.

BACKGROUND OF THE INVENTION

Wireless communication systems are generally allocated a portion of the radio frequency (RF) spectrum for their operation. The allocated portion of the spectrum is divided into communication channels and channels are distinguished by frequency, time or code assignments, or by some combination of these assignments. Each of these communication channels will be referred to as conventional channels, and a conventional channel will correspond to a fill-duplex channel unless otherwise noted. The establishment of a communication link in a communication system depends not only on the availability of a conventional channel but also on the quality of communication that will result from the use of a given available conventional channel.

In wireless communication systems, a conventional channel is used for communication between a base station and a subscriber station. A base station provides coverage to a geographic area known as a cell and may be a point-of presence providing connection between the subscriber station and a wide area network such as a Public Switched Telephone Network (PSTN). The underlying motivation for the use of cells in wireless systems is the reuse of the RF spectrum in geographically different areas. The reuse of the frequency spectrum can introduce co-channel (intercell) interference between users in different cells that share a common conventional channel. If co-channel interference is not carefully controlled, it can severely degrade the quality of communications. System capacity is in general limited by interference because of the reduction in the number of reusable channels of acceptable quality.

Another source of conventional channel quality degradation is adjacent channel (intracell) interference caused by other conventional channels within a given cell. Ideally, within a given cell each conventional channel should be completely isolated from all of the other conventional channels (orthogonal). In practical systems, full orthogonality between channels can not be ensured because of the complexity and cost such a requirement would place on the system design. For example, adjacent channel interference can result, in FDMA systems, from RF carrier frequency offsets and imperfect filters; in TDMA systems, from timing offset and jitter; and, in CDMA systems, from synchronization inaccuracies or RF multipath propagation.

The more recently introduced SDMA systems (Roy et al., U.S. Pat. No. 5,515,378) allow multiple subscribers within a given cell to simultaneously share the same conventional channel without interfering with one another, and further, allow more frequent reuse of conventional channels within a geographical area covering many cells. SDMA exploits the spatial distribution of subscribers in order to increase usable system capacity. Because subscribers tend to be distributed over a cell area, each subscriber-base station pair will tend to have a unique spatial signature characterizing how the base station antenna array receives signals from the subscriber station, and a second spatial signature characterizing how the base station antenna array transmits signals to the subscriber station. Subscribers sharing the same conventional channel are said to be using different spatial channels. As in the case of FDMA, TDMA, and CDMA systems, spatial channels in a SDMA system may not be perfectly orthogonal because of hardware limitations and multipath propagation. It should be noted that non-spatial multiplexing (e.g., FDMA, TDMA, and CDMA), when used in combination with antenna array patterns that are controlled by using spatial processing, is referred to as SDMA in the context of this invention. In practice, spatial signatures and antenna arrays can be used in a non-spatial-division-multiple-access system configuration for enhancing communications between base stations and subscribers by use of spatial signal processing techniques. In these cases, the label SDMA will still be used in the context of the description that follows.

FIG. 1 shows an example of a wireless SDMA TD/FD/CDMA system (Barratt et al., U.S. patent application Ser. No. 08/375,848) in which a number of subscriber stations (symbolically shown as handsets) 20, 22, 24 are being served by base station 100 that may be connected to a wide area network (WAN) 56 for providing any required data services and connections external to the immediate wireless system. Switching network 58 interfaces with WAN 56 for providing multichannel duplex operation with the WAN by switching incoming WAN data to lines 60 of base station 100 and switching outgoing signals from base station 100, on line 54 to the WAN. Incoming lines 60 are applied to signal modulators 62 that produce modulated signals 64 for each subscriber station the base station is transmitting to. A set of spatial multiplexing weights 74 for each subscriber station are applied to the respective modulated signals in spatial multiplexers 66 to produce spatially multiplexed signals 68 to be transmitted by a bank of multichannel transmitters 70 using transmit antenna array 18. The SDMA processor (SDMAP) 48 produces and maintains spatial signatures for each subscriber station for each conventional channel, calculates spatial multiplexing and demultiplexing weights for use by spatial multiplexers 66 and spatial demultiplexers 46, and uses the received signal measurements 44 to select a channel for a new connection. In this manner the signals from the current active subscriber stations, some of which may be active on the same conventional channel, are separated and interference and noise suppressed. When communicating from the base station to the subscriber stations, an optimized multilobe antenna radiation pattern tailored to the current active subscriber station connections and interference situation is created. An example of a transmit antenna pattern that may be created is shown in FIG. 2.

Returning to FIG. 1, spatial demultiplexers 46 combine received signal measurements 44 from the multichannel receivers 42 and associated antenna array 19 according to spatial demultiplexing weights 76, a separate set of demultiplexing weights being applied for each subscriber station communicating with the base station. The outputs of spatial demultiplexers 46 are spatially separated signals 50 for each subscriber station communicating with the base station, which are applied to signal demodulators 52 to produced demodulated received signals 54 for each subscriber station communicating with the base station. In an alternate embodiment, the demultiplexing and demodulation processing are performed together in a nonlinear multidimensional signal processing unit.

The demodulated received signals 54 are then available to switching network 58 and WAN 56.

In an FDMA system implementation, each multichannel receiver and each multichannel transmitter is capable of handling multiple frequency channels. In other embodiments, multichannel receivers 42 and multichannel transmitters 70 may instead handle multiple time slots, as in a TDMA system; multiple codes, as in a CDMA system, or some combination of these well known multiple access techniques (Barratt et al., U.S. patent application Ser. No. 08/375,848).

In practical systems that may involve hundreds or thousands of subscriber stations, perfect separation or orthogonality between every subscriber station, following the application of SDMA processing, cannot be insured because of the complexity and cost that such a requirement would place on the system design. If the separation of subscriber station connections post-SDMA processing cannot be ensured, the extended capacity of the SDMA will be limited and interference between subscribers will occur from the use of SDMA techniques. The consequence of this practical limitation is that a method for minimizing the interference and thereby maximizing the effective channel capacity of the SDMA system is required.

Even if two or more subscriber stations are not perfectly separated or orthogonal after SDMA processing, it still may be possible to share a common conventional channel in a TDMA, FDMA or CDMA system using SDMA technology. From a practical point of view, it is not required that the subscriber stations be perfectly separated after SDMA processing to share a common conventional channel. It is only required that the interference between subscribers sharing a common conventional channel post-SDMA processing be low enough so as not to reduce the quality of communications below a prescribed level.

Because of the interference introduced by frequency reuse and the fragile nature of orthogonality for conventional and spatial channels, all wireless multiple access communications systems need a method for base station and channel assignment that minimizes these adverse effects when a new call or connection between a base station and a subscriber is made. The labels new subscriber and new connection will be used interchangeably to denote a new call or connection between a base station and a subscriber station, and the labels active subscriber, existing connection and existing subscriber will be used interchangeably to denote a call or connection in-progress between a base station and a subscriber station. If not careful, the new subscriber may be assigned to a base station and a channel on which poor quality is experienced due to excessive interference. Moreover, the addition of a new subscriber has the potential consequence of adversely affecting the quality of communications on existing connections. Also, existing subscribers can suffer from increased channel interference from the addition of a new subscriber, or other unrelated causes, that can require moving subscribers from currently assigned channels to new channels in order to restore Acceptable quality communications. Channel re-assignment methods, using decision processes similar to those used for initial base station and channel assignment, are also required.

Prior art channel assignment and reassignment methods are based on measurements of physical phenomena such as the received signal strength indication (RSSI) or the co-channel interference on different conventional channels. Barnett, in U.S. Pat. No. 5,557,657, describes a method for handover between an overlay cell and an underlay cell depending on the RSSI. Booth (U.S. Pat. No. 5,555,445) describes a method for intercell handoff in which an intracell handoff from one conventional channel to another is first attempted, and the success or failure of the handoff is indicated by the RSSI. Knudsen (U.S. Pat. No. 5,448,621) describes a method for reallocating conventional channels between cells that depends on the number of unused conventional channels in each cell (i.e., the cell load). Grube et al. (U.S. Pat. No. 5,319,796) outlines a method for measuring co-channel interference on a conventional channel by placing additional receivers in the coverage area of the co-channel user and then transmitting feedback information on measured co-channel interference to a channel assignment controller. In all of these methods, the processes of channel assignment and reassignment do not take the spatial distribution of the subscribers into account, nor do they consider how the RSSI and co-channel interference jointly affect the signal quality of the new connection.

Hanabe (U.S. Pat. No. 5,475,864) describes a channel assignment method for sectorized cells which have static antenna beam patterns. Hanabe does not consider what happens with fully adaptive SDMA systems in which beam patterns dynamically change depending on which subscribers are active at any given time. Furthermore, the channel assignment of spatial channels made possible by SDMA is never addressed.

If two subscribers with similar spatial signatures were to be assigned to the same conventional channel, either at the same base station or at two different base stations, serious interference would render the channel unusable to both subscribers. Hence, there is a need for a new method of channel assignment for advanced, fully adaptive SDMA systems that can predict, a priori, the quality of a spatial or conventional channel; i.e., before the new connection is assigned to a given base station and channel. Also, there is a need for a SDMA channel assignment method that can predict the impact of a new connection on existing connections and can perform call admission control as necessary. The availability of such base station and channel assignment, reassignment, and admission control methods would allow SDMA methods to increase system capacity by better isolating subscribers while maintaining acceptable communications quality.

SUMMARY OF THE INVENTION

The present invention includes methods for channel assignment, channel reassignment, and call admission control suitable for SDMA systems that accommodate the dynamically adaptive spatial channel conditions and allow for more frequent reuse of conventional channels.

Three methods for uplink channel assignment are described: a Weighted Correlation method, a Predicted Quality method, and a Hierarchical method.

The Weighted Correlation method computes a cost function for each conventional channel based on a weighted correlation of the new subscriber's spatial signature with the spatial signatures of the active subscribers. The spatial signatures of the active subscribers need not be explicitly known to compute the cost function. In an embodiment in which no knowledge about the active subscriber signatures is assumed, the cost function is formed using an unstructured estimate of the sample covariance matrix, which is computed from measurements of the antenna array response for a prescribed number of time samples. In an alternate embodiment, a structured estimate of the sample covariance matrix, based on the spatial signatures of active subscribers and a noise-plus-interference covariance matrix, is used to compute the cost function. In one embodiment, a conventional channel with acceptably low cost is assigned to the new connection. In another embodiment, the conventional channel with the minimum cost is assigned to the new connection. The set of candidate conventional channels from which a channel for assignment is to be selected may be constrained to the subset of channels for which the cost of the new subscriber is less than a prescribed threshold. The assignment of more than one subscriber to the same conventional channel is permitted if there are sufficient hardware resources at the chosen base station for the selected channel to accommodate the new connection. If no candidate channels are found, the new subscriber is not assigned to the chosen base station.

The Predicted Quality channel assignment method predicts the uplink received signal power and interference-plus-noise for each conventional channel, based on an estimate (predicted value) of the sample covariance matrix of received signals at the base station antenna array that may result should the new subscriber be assigned to, and become active on, a given channel. The method may use an unstructured estimate of the sample covariance matrix of received signals from subscribers already active, by measuring the base station array response for a prescribed number of samples, or else the method may use a structured estimate of the sample covariance matrix, based on the spatial signatures of already active subscribers and a noise-plus-interference covariance matrix. In one embodiment, the cost function for a conventional channel is computed as the predicted interference on that channel. In an alternative embodiment, the cost function for a conventional channel is computed as the negative of the predicted signal-to-interference-plus-noise ratio (SINR) of the new connection on that channel. In either case, the new subscriber may be assigned to a conventional channel with an acceptably low cost, or else to the conventional channel with the minimum cost. The set of candidate conventional channels from which a channel for assignment is to be selected may be constrained to the subset of channels for which the predicted SINR of the new subscriber, and, optionally, the predicted SINRs of the active co-channel subscribers, is/are greater than a prescribed threshold. In all these cases, the assignment of more than one subscriber to the same conventional channel is permitted if there are sufficient hardware resources at the selected base station for the chosen channel to accommodate the new connection. If no candidate channels are found, the new subscriber is not assigned to the selected base station.

The Hierarchical method uses the Weighted Correlation method to select a subset of candidate channels that represent the channels with the lowest cost as determined by the Weighted Correlation method. The channel assignment is then made by applying the Predictive Quality method to the subset of candidate channels.

The Downlink Predictive channel assignment method, when not constrained by the uplink channel assignment, assigns a conventional channel to a new connection by having the new subscriber report the downlink received signal level for each conventional channel and estimating the downlink interference-plus-noise level from the subscriber report. In one embodiment, the cost function for a conventional channel is computed as the downlink interference-plus-noise level on that channel. Alternatively, the downlink spatial signature and associated multiplexing weights of the new connection on each conventional channel are further used to compute a predicted downlink received signal level. The cost function for a conventional channel is then computed as the negative of the predicted downlink SINR for the channel. In either case, the new subscriber may be assigned to a conventional channel with an acceptably low cost, or else to the conventional channel with the minimum cost. The set of candidate conventional channels to select from may be constrained to the subset of channels for which the predicted SINR of the new subscriber, and optionally, the predicted SINRs of the active co-channel subscribers, is/are greater than a prescribed threshold. In all these cases, the assignment of more than one subscriber to the same conventional channel is permitted if there are sufficient hardware resources at the selected base station for the chosen channel to accommodate the new connection. If no candidate channels are found, the new subscriber is not assigned to the selected base station.

In addition, for all uplink and downlink channel assignment methods an optional distortion criterion may be added which estimates the transmitter and/or receiver distortion effects produced by any particular conventional channel assignment by computing a crest factor. In one embodiment, the effect is expressed by augmenting the cost function for any particular channel assignment method with the crest factor cost. In the preferred embodiment, the effect is expressed by constraining the selection of a conventional channel to among those channels with an acceptably low crest factor.

The Joint Uplink-Downlink channel assignment method combines the cost function of an uplink method with that of a downlink method to form a joint cost function. The new subscriber may be assigned to a conventional channel with an acceptably low joint cost, or else to the conventional channel with the minimum joint cost. The set of candidate conventional channels to select from may be constrained to the subset of channels satisfying the constraints of the uplink method and the downlink method. The assignment of more than one subscriber to the same conventional channel is permitted if there are sufficient hardware resources at the selected base station for the chosen channel to accommodate the new connection. If no candidate channels are found, the new subscriber is not assigned to the selected base station.

All of the channel assignment methods may be applied to either a set of candidate conventional channels associated with any particular base station or else a set of candidate conventional channels associated with a multiplicity of base stations. In the latter embodiment, the channel assignment method performs the selection of a base station in addition to the selection of a conventional channel for the new connection.

Channel re-assignment may be accomplished by any of the above methods for channel assignment, with the modification that the conventional channel the subscriber wishes to be reassigned from is omitted from the set of candidate conventional channels.

Three methods for call admission control include: a Weighted Correlation method that includes comparing the cost of assigning a selected conventional channel to a new connection against a prescribed threshold, assigning the selected channel if the threshold is exceeded, otherwise rejecting the selected channel; a Predictive method that includes comparing the predicted uplink and/or downlink SINR of a selected conventional channel against the corresponding prescribed uplink and/or SINR threshold(s), assigning the selected channel if the candidate SINR(s) exceed(s) the threshold(s), and blocking the assignment if otherwise; and a general Load Estimation method that is applicable to SDMA and non-SDMA systems that includes estimating the system call load, prescribing a call load threshold indicative of the number of calls in progress, comparing the estimated system call load with the call load threshold, assigning the selected channel if the estimated load is less than threshold, and blocking assignment if otherwise.

BRIEF DESCRIPTION OF THE DRAWINGS

FIG. 3($b$) is a flow diagram for computing the unstructured form of the covariance matrix;

FIG. 3($c$) is a flow diagram for computing the structured form of the covariance matrix;

DETAILED DESCRIPTION OF THE INVENTION

Figure 1:
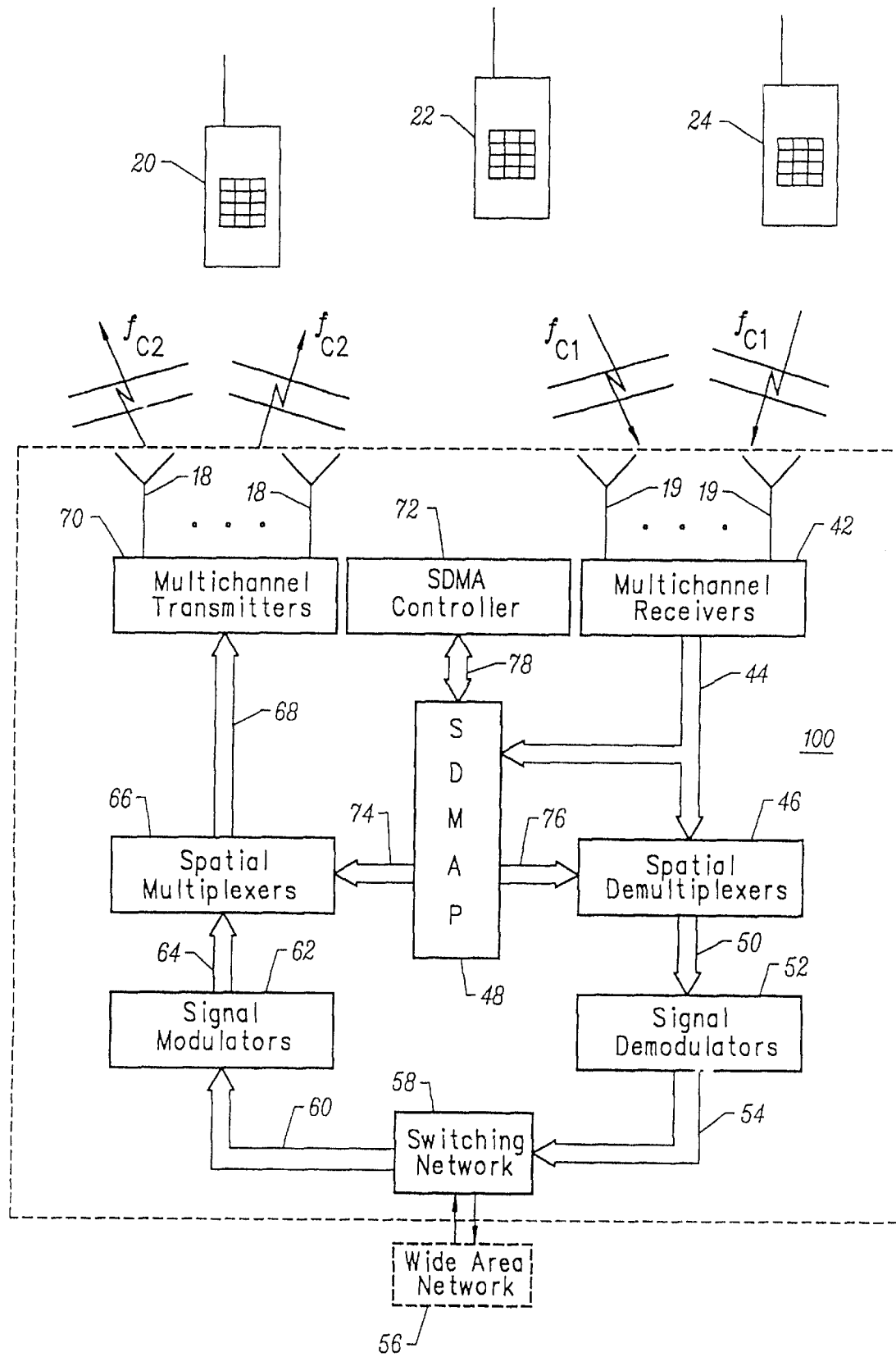
FIG. 1 is a graphical representation of a SDMA system.
Figure 2:
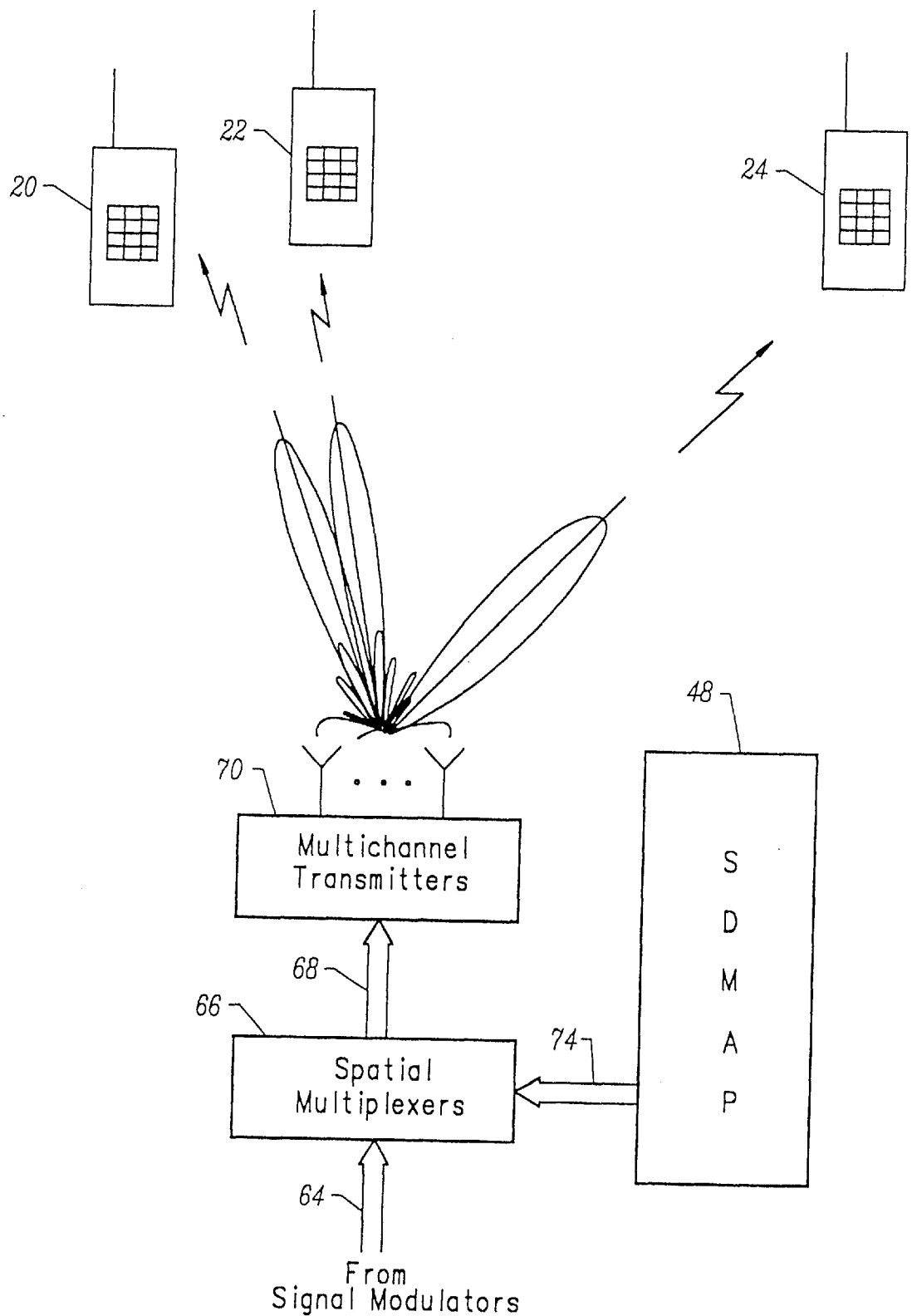
FIG. 2 is a graphical representation of the SDMA multi-channel transmitters' antenna patterns generated from three multiplexing weight vectors.

Channel assignment in a full-duplex communication channel includes the selection of both an uplink channel (from subscriber to cell base station) and a downlink channel (from cell base station to subscriber). The case of half-duplex channel assignment may be considered as a special case of the full-duplex problem. Interference on the uplink channel comes primarily from other subscriber stations while interference on the downlink channel is caused primarily by base stations of other cells. Consequently, the quality of communications on the uplink and downlink channels will generally differ. In one embodiment of the invention, uplink and downlink channel assignments are performed independently and separately and, because of this lack of constraints in selecting the uplink and downlink channels, offers the potential for achieving the highest system capacity. However, many practical systems impose a fixed relationship between the uplink and downlink channels so that independent selection is not possible.

For example, in the Personal Handyphone System (PHS) standard (Association of Radio Industries and Businesses (ARIB) Preliminary Standard, Version 2, RCR STD 28, approved by the Standard Assembly Meeting of December, 1995), the uplink and downlink channels form a full-duplex channel and must be on the same RF carrier, so that the carrier frequency of uplink and downlink channel can not be independently specified. Also, the downlink time division multiplexed time-slot is specified as preceding the uplink time-slot by exactly four time-slots. For such systems, the selection of either uplink or downlink channel automatically determines the selection of the other. In one embodiment, the selection of a full-duplex channel is achieved by performing an uplink channel assignment and specifying the downlink assignment in accordance with the existing rules of the system. This method is advantageous when the capacity of the full-duplex channel system is primarily uplink channel capacity limited. In another embodiment, the full-duplex channel is chosen by performing the downlink channel assignment and allowing the choice of the uplink assignment to be fixed by the rules of the system. This method is preferred when the system is primarily downlink channel capacity limited. In another embodiment, the assignment of the uplink and downlink channel is considered jointly by evaluating each uplink-downlink channel pair as a unit and assigning a new subscriber to the best uplink-downlink pair. This method is preferred for systems in which the channel capacity is dominated by neither uplink nor downlink channel capacity.

Other practical considerations for channel assignment are the dynamic range of the RF power amplifiers (PAs) and whether the base station transmitter architecture is wideband or narrowband. The dynamic range of a PA is limited on the low power end by the noise floor and on the high power end by the maximum PA output for which the distortion of the amplified signal remains acceptably low. A channel assignment method must be aware of the PA dynamic range characteristics when selecting a channel because the required transmit power may differ from channel to channel.

A base station transmitter PA also generates intermodulation distortion from the mixing of RF subcarriers of differing frequencies. In a narrowband RF transmitter architecture, the power delivered for each subcarrier is provided by a separate PA so that the mixing of different subcarrier bands does not occur, greatly reducing the intermodulation distortion. Further, any distortion products generated from in-band mixing by each PA which fall outside of the subcarrier band can be filtered so as to minimize the distortion products that can cause interference with other subcarriers. By contrast, a transmitter with a wideband PA architecture uses a multi-carrier power amplifier (MCPA) that amplifies a group of subcarriers simultaneously, producing intermodulation distortion from the mixing of different subcarriers. The intermodulation distortion so generated overlaps with the group of subcarrier bands carrying the subscriber signals and cannot be separated and filtered. The MCPA produces intermodulation products due to the presence of a multicarrier RF signal. While it is possible to produce an MCPA with very low intermodulation distortion, the cost of doing so is very high. Thus, there is a need for a channel assignment method that helps mitigate the effects of intermodulation distortion by taking the PA architecture into account and permitting a lower cost solution to be used.

Analogous problems with distortion also exist in a wideband receiver architecture. For example, sources of non-linearities in the receiver include RF mixers, low noise amplifiers and analog-to-digital converters. A channel assignment algorithm must take this information into account or else the capacity of the network may be adversely affected.

As previously explained, in SDMA there are two spatial signatures associated with each subscriber-base station pair on a particular conventional channel (Barratt et al., U.S. patent Application Ser. No. 08/375,848). A base station associates with each subscriber station a receive, or uplink, spatial signature related to how that subscriber station receives signals transmitted to it by the base station's antenna array and a transmit, or downlink, spatial signature related to how the base station's receive antenna array receives signals transmitted by the subscriber station. The transmit and receive spatial signatures contain information about the amplitude attenuation and relative phase of the RF signal at each antenna element transmitter and receiver, respectively, of the base station. This amplitude and phase information at each receiver or transmitter can be treated as vector elements, $\{a_i\}$, of a complex column vector, a. The spatial signatures can be stored in a database and updated at prescribed intervals, or they may be estimated during the initial phase of a call setup when a new connection from a subscriber is initiated, or they may be analytically determined (Roy et al., U.S. Pat. No. 5,515,378). For example, in the case of PHS, a link channel establishment phase takes place on the signaling control channel (SCCH) before communicating on an assigned link (traffic) channel (LCH). During this link channel establishment phase, the spatial signatures of the new subscriber can be measured.

The spatial signatures contain information about the ability to communicate with a subscriber. If $a_k^i$ and $a_k^j$ are the receive spatial signatures for subscribers i and j, respectively, on conventional channel k, then their normalized absolute inner product is defined as $$\frac{|a_k^{i*} a_k^j|}{\|a_k^i\| \cdot \|a_k^j\|},$$

where $\|\ \|$ denotes the complex modulus, $(\ )^*$ denotes the complex conjugate transpose and $\|\|\ \|\|$ denotes the Euclidean norm of a complex vector. The normalized absolute inner product of $a_k^i$ and $a_k^j$ is indicative of the ability to simultaneously communicate to subscribers i and j on the same uplink conventional channel. Orthogonal signatures would have a normalized absolute inner product of zero, indicating that interference between subscribers is unlikely even if both share a common conventional channel. A significant normalized absolute inner product value would indicate a potential interference problem if both subscribers were to share a common conventional channel. However, there are two problems with the use of the normalized absolute inner product as a basis of channel assignment: it may be too difficult (i.e., complex and/or expensive) to keep track of the spatial signatures for all channels of all subscribers in adjacent cells; and a significant normalized absolute inner product does not necessarily indicate an interference problem because, for example, subscribers within different cells may have a large normalized absolute inner product between spatial signatures and not interfere if they are isolated by large distances or by high loss RF propagation paths. Therefore, the received signal levels of the subscribers on a given conventional channel from surrounding subscribers will also determine whether there will be an unacceptable level of interference on that channel.

Several optional approaches to uplink channel assignment are available, each varying in relative complexity and performance characteristics: a Weighted Correlation method, a Predicted Quality method, and a Hierarchical method combining both the Weighted Correlation method and the Predicted Quality method.

The Weighted Correlation method defines a quadratic cost function for the $k^{th}$ conventional channel as $$c_k = a_k^* \hat{R}_{zz}^{(k)} a_k \qquad \text{Eq. 1}$$

where $a_k$ is the uplink spatial signature of the new subscriber on conventional channel k and $R_{zz}^{(k)}$ is the sample covariance matrix of the antenna array response of conventional channel k. The spatial signature $a_k$ is typically estimated during call setup, or it may be stored in a database and updated at prescribed intervals. An unstructured estimate of the sample covariance matrix which does not require a priori knowledge of the spatial signatures of the active subscribers may be computed, typically by measuring the received signal at each antenna element receiver of FIG. 1 over several time samples and averaging; i.e., $$\hat{R}_{zz}^{(k)} = \frac{1}{n} \sum_{i=1}^{n} z^{(k)}(i) z^{(k)*}(i) \qquad \text{Eq. 2}$$

where $z^{(k)}(i)$ is the vector received signal of the antenna array on conventional channel k at time i, and n is the number of time samples. For example, in the PHS system, n may be chosen to be the number of data symbols in a PHS burst. In one embodiment, the new subscriber's call is assigned to a conventional channel with an acceptable cost, $c_k$. The acceptable cost level can be that which corresponds to an acceptable bit error rate for communication between the base station and the subscriber station. In the preferred embodiment, the new subscriber's call is assigned to the conventional channel for which the cost function, $c_k$, of Eq. (1) is minimal. The assignment of more than one subscriber to the same conventional channel is permitted if there are sufficient hardware resources at the selected base station for the chosen channel to accommodate the new connection.

If an unstructured estimate of $\hat{R}_{zz}^{(k)}$ is used in Eq. (1), then the channel assignment method described above can operate in the absence of any form of information exchange or communication between different base stations. By performing an unstructured estimate, the spatial signatures of all active subscribers, both within the same cell as well as in neighboring cells, have been accounted for without having to explicitly measure them one-by-one.

Alternatively, a structured estimate of the sample covariance matrix which takes advantage of any knowledge about the spatial signatures of active subscribers may be computed. In a wireless system employing SDMA, a base station may know the spatial signatures and transmit signal powers of the active subscribers with which it is communicating. Hence, in an alternative embodiment, the cost function of Eq. (1) can be computed by performing a structured estimate of the sample covariance matrix $\hat{R}_{zz}^{(k)}$:

$$\hat{R}_{zz}^{(k)} = A_k R_{ss}^{(k)} A_k^* + R_{nn}^{(k)} \qquad \text{Eq. 3}$$

where $A_k$ is the collection of spatial signatures formed by column-wise concatenation of the spatial signatures on conventional channel k of active subscribers in the same cell as the new connection, $R_{ss}^{(k)}$ is an expected cross-correlation matrix whose diagonal elements are the average transmit powers of the active subscribers on conventional channel k in the same cell as the new connection, and $R_{nn}^{(k)}$ is a noise-plus-interference covariance matrix containing the contributions of noise and intercell interference to the received signals at the base station antenna array. $R_{nn}^{(k)}$ may be estimated by measuring the received signal at each antenna element receiver of FIG. 1 during time intervals when the active subscribers on channel k and in the same cell as the new connection are not transmitting and then time averaging, as in Eq. (2). Alternatively, if the spatial signatures and transmit powers of all active subscribers are available at each base station, $R_{nn}^{(k)}$ may be estimated as $$R_{nn}^{(k)} = A_k^0 R_{s_0 s_0}^{(k)} A_k^{0*} + Q$$

where $R_{s_0s_0}^{(k)}$ an expected cross-correlation matrix whose elements are the average transmit powers of the active subscribers on conventional channel k in cells different from that of the new connection. $A_k^0$ is the collection of spatial signatures formed by column-wise concatenation of the known spatial signatures on conventional channel k of active subscribers in cells different from that of the new connection received at the base station of the new connection. Q is the estimated receiver noise covariance matrix. The contents of Q can also be regarded as regularization parameters chosen by the user. In many common cases, $Q=\sigma^2I$, where I is the identity matrix and $\sigma^2$ is the estimated receiver noise.

In one embodiment, the new subscriber's call is assigned to a conventional channel with an acceptable cost, $c_k$. In the preferred embodiment, the new subscriber's call is assigned to the conventional channel for which the cost function, $c_k$, of Eq. (1) is minimal. The assignment of more than one subscriber to the same conventional channel is permitted if there are sufficient hardware resources at the selected base station for the chosen channel to accommodate the new connection in additional to any existing connections.

In a typical SDMA system, the sample covariance matrix of Eq. (2) or Eq. (3) is computed and continually updated as part of the spatial processing for each conventional channel, thus obviating the need to recompute it for channel assignment. The computations required by Eq. (1) are then minimal.

A further improvement in channel assignment is obtained by use of the Predicted Quality Channel Assignment Method by predicting the quality of communication that will result from assigning a new connection to a particular conventional channel. This is accomplished by estimating the signal power and the interference-plus-noise power that a new subscriber will experience on each conventional channel if assigned to that channel by using a model of the RF environment and the SDMA processing, without actually assigning the call to any conventional channel.

Let $\hat{R}_{zz}^{(k)}$ represent the sample covariance matrix before the new subscriber is assigned to conventional channel k, and $\tilde{R}_{zz}^{(k)}$ represent the predicted covariance matrix if the new subscriber were to be assigned to and become active on conventional channel k. As described previously, $\hat{R}_{zz}^{(k)}$ may be computed by either an unstructured estimate (Eq. (2)) or a structured estimate (Eq. (3)). In the preferred embodiment, the relationship between $\hat{R}_{zz}^{(k)}$ and $\tilde{R}_{zz}^{(k)}$ is modeled by $$\tilde{R}_{zz}^{(k)}=\hat{R}_{zz}^{(k)}+a_k r_{ss}^{(k)} a_k^* \quad \text{Eq. 5}$$

where $a_k$ is the uplink spatial signature of the new subscriber on conventional channel k and $r_{ss}^{(k)}$ is a scalar quantity representing the transmit power of the new subscriber on conventional channel k.

In the preferred embodiment, the uplink spatial demultiplexing weights, $\tilde{w}_k^U$, for the new subscriber on conventional channel k are expressed as the column vector $$\tilde{R}_k^U=(\tilde{R}_{zz}^{(k)})^{-1}{}_{ss}a_k \quad \text{Eq. 6}$$

It should be noted that the above expression requires the inverse of $\tilde{R}_{zz}^{(k)}$ which is usually undesirable because computing the inverse is computationally expensive. However, by taking advantage of the model for $\tilde{R}_{zz}^{(k)}$ in Eq. (5), and by invoking the Sherman-Morrison inversion formula ("Matrix Computations", Golub et al., The Johns Hopkins University Press, Baltimore, Md., 1983, p. 3), the inverse of $\tilde{R}_{zz}^{(k)}$ may be expressed as $$(\tilde{R}_{zz}^{(k)})^{-1}=(\hat{R}_{zz}^{(k)})^{-1}-(\hat{R}_{zz}^{(k)})^{-1}a_k a_k^* (\hat{R}_{zz}^{(k)})^{-1}/ ((1/r_{ss}^{(k)})+{}_k^*(\hat{R}_{zz}^{(k)})^{-1}a_k) \quad \text{Eq. 7}$$

Thus, by using this expression the process of matrix inversion has been reduced to a series of simpler matrix multiplication computations. Further, it should be noted that in a typical SDMA system, the inverse of the sample covariance matrix before the new subscriber is assigned to conventional channel k, $(\hat{R}_{zz}^{(k)})^{-1}$ been computed and is continually updated as part of the spatial processing for the already active subscribers on each conventional channel k, making it unnecessary to compute it when using Eq. (7).

The predicted uplink signal power that would result from the assignment of the new subscriber to channel k, $S_k^U$, is estimated as $$S_k^U=|\tilde{w}_k^{U*}a_k|^2 r_{ss} \quad \text{Eq. 8}$$

and $I_k^U$, the uplink interference-plus-noise power for the new subscriber, is estimated as $$I_k^U=\tilde{w}_k^{U*}\hat{R}_{zz}^{(k)}\tilde{w}_k^U \quad \text{Eq. 9}$$

Having computed $S_k^U$ and $I_k^U$ for each conventional channel k, the uplink signal-to-interference-plus-noise ratio (SINR) of the new connection on each channel k is estimated by $$SINR_k=S_k^U/I_k^U \quad \text{Eq. 10}$$

In one embodiment, the cost function for conventional channel k is computed as $I_k^U$. The new subscriber is assigned either to the first conventional channel for which the computed cost is acceptably low, or else to the conventional channel with the minimal cost. (One definition for an acceptably low computed cost is a cost that is equal to, or less than, the cost that corresponds to a maximal acceptable bit error rate between a subscriber and the base station.) The rationale is that a conventional channel assigned to the new subscriber on which interference from existing subscribers is acceptably low will, by reciprocity, tend to be a channel on which the new subscriber will produce acceptably low interference with the existing subscribers.

In an alternative embodiment, the cost function for any conventional channel k is computed as $-SINR_k$, the negative of the predicted SINR on that channel.

The new subscriber is assigned either to the first conventional channel for which the computed cost function is acceptably low, or else to the conventional channel with the minimal cost. This method is useful for, but not limited to, wireless systems which employ means for controlling transmit power levels as are well-known in the art. In this way, the new subscriber can use the lowest transmit power and thereby maximally reduce interference in the system. However, for various reasons (e.g., if the power control range is very limited), conventional channel assignment can always be made under the rule described in the previous paragraph for Predicted Quality channel assignment.

For either of the embodiments described in the preceding two paragraphs, the set of candidate channels that the channel assignment method chooses from may be constrained to the subset of channels for which the predicted signal-to-interference-plus-noise-ratios of the new connection exceed a prescribed threshold level. Typically the threshold is set at or near the SINR required to maintain an acceptable bit-error-rate for connection between the subscriber station and the base-station.

In a wireless system employing SDMA, a base station typically knows the spatial signatures and transmit powers of the active subscribers with which it is communicating. This knowledge about the co-channel active subscribers may optionally be exploited in the Predicted Quality channel assignment method to predict $SINR_{k,i}$, the uplink signal-to-interference-plus-noise ratio experienced by each co-channel active subscriber i on each conventional channel k if the new connection was to be assigned to channel k, without actually assigning the call to any conventional channel. Denote the uplink transmit signal power and uplink spatial signature of co-channel active subscriber i on conventional channel k by $r_{k,i}$ and $a_{k,i}$, respectively. Then for each co-channel active subscriber i on each conventional channel k, the predicted spatial demultiplexing weights $\tilde{w}_{k,i}^{U}$, the predicted uplink signal power $S_{k,i}^{U}$ and the predicted uplink interference-plus-noise noise power $I_{k,i}^{U}$ are computed as $$\tilde{w}_{k,i}^{U} = (\tilde{R}_{zz}^{(k),i})^{-1} r_{k,i} a_{k,i} \qquad \text{Eq. 11}$$

$$S_{k,i}^{U} = |\tilde{w}_{k,i}^{U*} a_{k,i}|^2 r_{k,i} \qquad \text{Eq. 12}$$

$$I_{k,i}^{U} = |\tilde{w}_{k,i}^{U*} \tilde{R}_{zz}^{(k),i} \tilde{w}_{k,i}^{U} - S_{k,i}^{U} \qquad \text{Eq. 13}$$

where $\tilde{R}_{zz}^{(k),i}$ denotes the predicted sample covariance matrix at the base station currently communicating with active subscriber i on conventional channel k if the new subscriber was to be assigned to, and become active on the channel. $\tilde{R}_{zz}^{(k),i}$ is computed similar to Eq. (7):

$$(\tilde{R}_{zz}^{(k),i})^{-1} = (\hat{R}_{zz}^{(k),i})^{-1} - (\hat{R}_{zz}^{(k),i})^{-1} a_k^i a_k^{i*} (\hat{R}_{zz}^{(k),i})^{-1} / ((1/r_{ss}^{(k)}) + a_k^{i*} (\hat{R}_{zz}^{(k),i})^{-1} a_k^i)$$

where $a_k^i$ is the uplink spatial signature of the new subscriber to the base station currently communicating with active subscriber i on conventional channel k and $\hat{R}_{zz}^{(k),i}$ is the sample covariance matrix at the base station currently communicating with active subscriber i on conventional channel k. The predicted uplink SINR of active subscriber i on channel k, $SINR_{k,i}$, is then computed as $SINR_{k,i} = S_{k,i}^{U}/I_{k,i}^{U}$.

The Predicted Quality channel assignment method may optionally then be further constrained to only permit assignment of the new subscriber to conventional channel k if the predicted uplink SINRs of all active subscribers on that channel exceed a prescribed threshold level.

The Hierarchical method combines the advantages of the Weighted Correlation method and the Predicted Quality method for conventional channel assignment by applying the low complexity Weighted Correlation method as a means for selecting a small subset of the least costly conventional channels and then applying the more optimal Predictive Quality method to the small subset for selecting the best conventional channel.

In the preceding description, consideration has been given to the assignment of uplink channels from the subscribers to the base station. Now consideration is given to the assignment of downlink channels from the base station to the subscriber stations.

During the initial phase of a call setup, for example, the subscriber station can measure the downlink received power levels on all of the conventional channels and report the measurements to the base station. This method is preferred if it does not introduce excessive latency (setup time). Alternatively, each subscriber station can periodically poll the downlink received power levels on all conventional channels whenever it is not actively making a call. The received power levels can be sent back to the base station over idle channels at prescribed intervals, or the power levels can be stored and updated at the subscriber station, and then all or a subset of the power levels communicated to the base station at the time of a call setup. Using these methods, the base station has a recent record of received power levels on all or a subset of the conventional channels for new subscribers.

In one embodiment, the received power level measured by the new subscriber on conventional channel k, $P_k$, is used as an estimate of $I_k^D$, the downlink interference-plus-noise power on conventional channel k. Alternatively, the estimate of $I_k^D$ may be further refined for any conventional channel k already supporting one or more existing subscribers in the same cell as the new subscriber, by introducing a test interval. The duration of the test interval is typically chosen to be a small multiple (e.g., between one and five) of the period between updates of the downlink multiplexing weights by the SDMAP in FIG. 1. During this test interval, the existing subscribers on channel k adjust their multiplexing weights as though the new subscriber has already been assigned to channel k. Methods for computing spatial multiplexing weights are described in Barratt et al., U.S. patent application Ser. No. 08/375,848. In the latter part of the test interval, the new subscriber station may measure the downlink received power on channel k and report the measurement to the base station. At the conclusion of the test interval, the existing subscribers on channel k readjust their multiplexing weights as though the new subscriber has been removed from channel k. The base station may then use $P'_k$, the downlink received power measured during the test interval, as a defined estimate of $I_k^D$.

The cost function for conventional channel k is defined to be $I_k^D$. In one embodiment, the new subscriber's call is assigned to a conventional channel with an acceptable cost. In another embodiment, the new subscriber's call is assigned to the conventional channel for which the cost function is minimal. The assignment of more than one subscriber to the same conventional channel is permitted if there are sufficient hardware resources at the selected channel to accommodate the new connection in additional to any existing connections.

A further improvement in downlink channel assignment is obtained by predicting the quality of communication that will result from assigning a new connection to a particular conventional channel. This is accomplished by predicting the downlink SINR that a new subscriber will experience on each conventional channel if assigned to that channel, without necessarily assigning the call to any conventional channel.

The spatial signature of a new subscriber on the downlink is estimated for each conventional channel. In the case of a time-division-duplex (TDD) system, the downlink spatial signature of a new subscriber can be related to the uplink signature through calibration of the two links. A description of the calibration method is found in Roy et al., U.S. Pat. No. 5,546,090. Other methods for estimating downlink spatial signatures are found in Barratt et al., U.S. patent application Ser. No. 08/375,848.

The downlink spatial multiplexing weights, $w_k^D$, for conventional channel k are then estimated. In a TDD system, the downlink weights $w_k^D$ can be related to the previously described uplink spatial multiplexing weights, $w_k^U$, of Eq. (6) through calibration of the two links (Roy et al., U.S. Pat. No. 5,546,090). Other methods for estimating downlink weights are found in Barratt et al., U.S. patent application Ser. No. 08/375,848.

Having obtained for conventional channel k the downlink spatial signature, $a_k^D$, and the spatial multiplexing weight vector, $w_k^D$ the downlink signal power received by the new subscriber on conventional channel k, $S_k^D$, can be predicted as $$S_k^D = |w_k^{D*} a_k^D|^2 \qquad \text{Eq. 14}$$

The downlink interference-plus-noise power level $I_k^D$ may be estimated by $P_k$ or $P'_k$, as described above. The choice of $P_k$ has the advantage of being minimally disruptive to existing subscribers, whereas $P'_k$ offers greater accuracy. An alternative method for estimating $I_k^D$ combines the advantages of $P_k$ and $P'_k$, at the expense of more computations but without using a test interval. The method starts with the assumption that $P_k$ is known, and constructs a model for $P_k$ as:

$$P_k = N_k + \sum_j \|W_{k,j}^{D*} a_k^{D,j}\|^2 \qquad \text{Eq. 15}$$

where $a_k^{D,j}$ is the downlink spatial signature on conventional channel k from base station j to the new subscriber whose multiplexing weights are unknown, $N_k$ is the contribution to received power from noise and interferers $W_{k,j}^D$ is the multiplexing weight matrix formed by column-wise concatenating the multiplexing weights of each active subscriber (expressed as a column vector) on conventional channel k and served by base station j, and the summation is computed over all base stations j for which the weight matrices $\{W_{k,j}^D\}$ and spatial signatures $\{a_k^{D,j}\}$ are known. For example, $\{W_{k,j}^D\}$ may consist of the weights of the active subscribers on channel k served by the same base station as that of the new call, and $\{a_k^{D,j}\}$ the corresponding transmit spatial signature on channel k from this base station to the new call. $W_{k,j}^D$, the multiplexing weight matrix for active subscribers on channel k served by base station j which account for the presence of the new subscriber, are then computed. There are many ways $W_{k,j}^D$ can be computed. For example, $W_{k,j}^D$ may be formed as $$W_{k,j}^{D*} = S_{k,j} A_{k,j}^\dagger \qquad \text{Eq. 16}$$

where $A_{k,j}$ is a matrix formed by column-wise concatenation of the known spatial signatures at base station j of the active subscriber on conventional channel k, $A_{k,j}^\dagger$ is the pseudo-inverse of $A_{k,j}$ (see "Matrix Computations", Golub et al., The Johns Hopkins University Press, Baltimore, Md., 1983), $S_{k,j}$ is a diagonal matrix of the signal amplitudes (which may be zero if the subscriber is not communicating with base station j). Note that U.S. patent application Ser. No. 08/375,848 uses matrix and vector notations which differ from the notation used in the present invention. However, such differences will be clear from the context to those of ordinary skill in the art.

In the illustrative embodiment, $\tilde{W}_{k,j}^D$ may then be computed from $$\begin{bmatrix} \tilde{W}_{k,j}^{D*} \\ w^* \end{bmatrix} = \tilde{S}_{k,j} [A_{k,j}\, a_k^{D,j}]^\dagger \qquad \text{Eq. 17}$$

where $a_k^{D,j}$ is the downlink spatial signature on conventional channel k from base station j to the new subscriber, $\tilde{S}_{k,j}$ is a diagonal matrix of transmit signal amplitudes, and $\tilde{W}_{k,j}^{D*}$ is the submatrix formed by excluding the bottom row of $$\begin{bmatrix} \tilde{W}_{k,j}^{D*} \\ w^* \end{bmatrix}.$$

The downlink interference-plus-noise power $I_k^D$ may then be predicted as $$I_k^D = P_k - \sum_j |W_{k,j}^{D*} a_k^{D,j}|^2 + \sum_j \|\tilde{W}_{k,j}^{D*} a_k^{D,j}\|^2$$

Having obtained $I_k^D$ by any of the three methods described above, and having computed $S_k^D$ from Eq. (14) for all conventional channels k, the predicted downlink signal-to-interference-noise-ratio for channel k (SINR) for each channel k is computed as $$SINR_k^D = S_k^D / I_k^D \qquad \text{Eq. 19}$$

In one embodiment, the cost function for conventional channel k is computed as $I_k^D$. The new subscriber is assigned to the first conventional channel for which the computed cost function is acceptably low, or else to the conventional channel with the minimal cost. In an alternative embodiment, the cost function for any conventional channel k is computed as $-SINR_k^D$, the negative of the predicted SINR on that channel. The new subscriber is assigned either to the first conventional channel for which the computed cost function is acceptably low, or else to the conventional channel with the minimal cost.

The embodiments described in the preceding paragraph may be further constrained to only consider a particular conventional channel k as a candidate for assignment if one or more of the following conditions hold:

(1) $SINR_k^D$ is greater than a prescribed threshold, typically set at or near the SINR required to maintain an acceptable bit-error-rate for connection between the subscriber station and the base-station;

(2) the total transmit power on conventional channel k, including all active spatial channels, does not exceed the usable dynamic range of the base station RF power amplifier; and (3) the predicted downlink signal to interference and noise ratio, $SINR_{k,i}^D$ experienced by each active subscriber, i, on conventional channel k, if the new connection were to be assigned to conventional channel k, is greater than some prescribed threshold.

The predicted downlink signal to interference and noise ratio for active subscriber i on conventional channel k, $SINR_{k,i}^D$ may be computed as follows. The downlink received power for active subscriber i on conventional channel k is denoted by $P_{k,i}$ and can be modeled by $$P_{k,i} = N_{k,i} + \sum_j \|W_{k,j}^{D*} a_{k,i}^{D,j}\|^2 \qquad \text{Eq. 20}$$

where $a_{k,i}^{D,j}$ is the downlink spatial signature on conventional channel k from base station j to active subscriber i, $N_{k,i}$ is the unmodeled contribution to received power from noise and interferers for active subscriber i on conventional channel k. Then for each base station j the predicted spatial multiplexing weight matrix $\tilde{W}_{k,j}^D$ for conventional channel k that accounts for the presence of the new subscriber is computed. The column of the multiplexing weight matrix corresponding to active subscriber i on conventional channel k is denoted $\tilde{w}_{k,j}^D$. The predicted downlink signal power $S_{k,i}^D$ and the predicted downlink interference-plus-noise power $I_{k,i}^D$ are computed as $$S_{k,i}^D = |\tilde{w}_{k,j}^{D*} a_{k,i}^D|^2 \qquad \text{Eq. 21}$$

$$P_{k,i}^D = N_{k,j} + \sum_j \|\tilde{W}_{k,j}^{D*} d_{k,i}^{D,j}\|^2 - D_{k,i}^D \quad \text{Eq. 22}$$

$$= P_{k,i} - \sum_i \|W_{k,j}^{D*} d_{k,i}^{D,j}\|^2 + \sum_j \|\tilde{W}_{k,j}^{D*} d_{k,i}^{D,j}\|^2 - S_{k,i}^D$$

The predicted downlink SINR of active subscriber i on conventional channel k, $SINR_{k,i}^D$ then computed as $SINR_{k,i}^D = S_{k,i}^D / I_{k,i}^D$.

As previously mentioned, the effect of intermodulation distortion is an important consideration for wideband radio transmitters and receivers, and can be taken into consideration during channel assignment by two methods based on the crest factor of the composite RF signal:

(1) augmenting the cost function for penalizing channel selections that are likely to make significant increases in intermodulation distortion as predicted by a significant increase in the crest factor; or (2) adding a constraint in the channel assignment process that prohibits the selection of any channel that causes the crest factor of the composite wideband RF signal to exceed a prescribed acceptable level.

For sake of clarity, in the ensuing discussion a wideband radio transmitter will be associated with the downlink channel and a wideband receiver with the uplink channel. Those of ordinary skill in the art will recognize that the channel assignment methods described herein which account for nonlinear distortion can be applied to a wideband transmitter or receiver employed on either uplink or downlink. In a wideband radio transmitter, intermodulation distortion levels are most severe when one or a few downlink channel carrier frequencies (sub-bands) are transmitting at much higher levels than the rest, because the intermodulation products tend to have prominent spectral peaks while composite wideband RF signals having more uniform spectral distributions tend to produce more uniform broadband intermodulation products. An analogous situation holds at a wideband radio receiver, wherein intermodulation distortion produced by RF mixers, low noise amplifiers, etc. tend to be the most severe if one or a few uplink channel carrier frequencies (sub-bands) have much higher received power levels than the rest. The crest factor, which is defined as a ratio of peak power in a given sub-band of a broadband signal to the power averaged over the total bandwidth of the composite RF signal, is a measure of magnitude of the offending spectral peaks. Because the assignment of spatial channels can significantly increase the transmit (received) power on a given downlink (uplink) conventional channel subcarrier by assigning multiple subscribers with different spatial signatures to the same conventional channel, the crest factor is an important tool for predicting intermodulation distortion. Also, a wideband radio system which uses TDMA can create large temporal power peaks during some time slots due to the subscriber channel assignments. Both spectral and temporal cresting are important considerations.

For a combined TDMA/FDMA wideband radio, control of intermodulation distortion due to temporal and frequency cresting is based on predicting the crest factor that would result by assigning a subscriber to a particular downlink or uplink conventional channel, time slot, and spatial channel. The uplink (downlink) temporal crest factor, $C_i$, during uplink (downlink) time slot i is defined as $$C_i = \frac{\max_{l=1,\ldots,L}\left\{\sum_{j=1}^{d_{i,l}} P_{i,j,l}\right\}}{(1/L) \sum_{l=1}^{L} \sum_{j=1}^{d_{i,l}} P_{i,j,l}} \quad \text{Eq. 23}$$

where L is the number of uplink (downlink) carrier frequencies, $d_{i,l}$ is the number of spatial channels on uplink (downlink) carrier frequency l and on uplink (downlink) time slot i, and $P_{i,j,l}$ is the receive (transmit) power of a subscriber on uplink (downlink) carrier frequency l, uplink (downlink) time slot i, and uplink (downlink) spatial channel j. Let the maximal uplink (downlink) crest factor over uplink (downlink) timeslots i be:

$$C_{max} = \max_i C_i \quad \text{Eq. 24}$$

In the preferred embodiment, the maximal uplink (downlink) crest factor, $C_{max}$, may be used by any of the previously described uplink (downlink) channel assignment methods as an additional constraint, by comparing its value with a prescribed threshold level, and prohibiting the channel selection if the threshold level is exceeded. The prescribed threshold level is obtained by measuring the intermodulation distortion level of the particular MCPA as a function of crest factor, in the case of the downlink; or by measuring the intermodulation distortion level of the aggregate analog receiver chain, in the case of the uplink.

Alternatively, the cost function $c_k$ for conventional channel k as computed by any previously described channel assignment method may be augmented by the crest factor as follows:

$$c'_k = c_k + \lambda C_{max} \quad \text{Eq. 25}$$

where $\lambda$ is a user-defined constant that determines the relative importance of the crest factor $C_{max}$ with respect to $c_k$.

While the description for the consideration of intermodulation distortion in channel assignment has been in terms of a combined TDMA/FDMA system, the invention is equally applicable to pure TDMA or FDMA systems, which may be treated as special cases of the combined system.

Figure 3A:
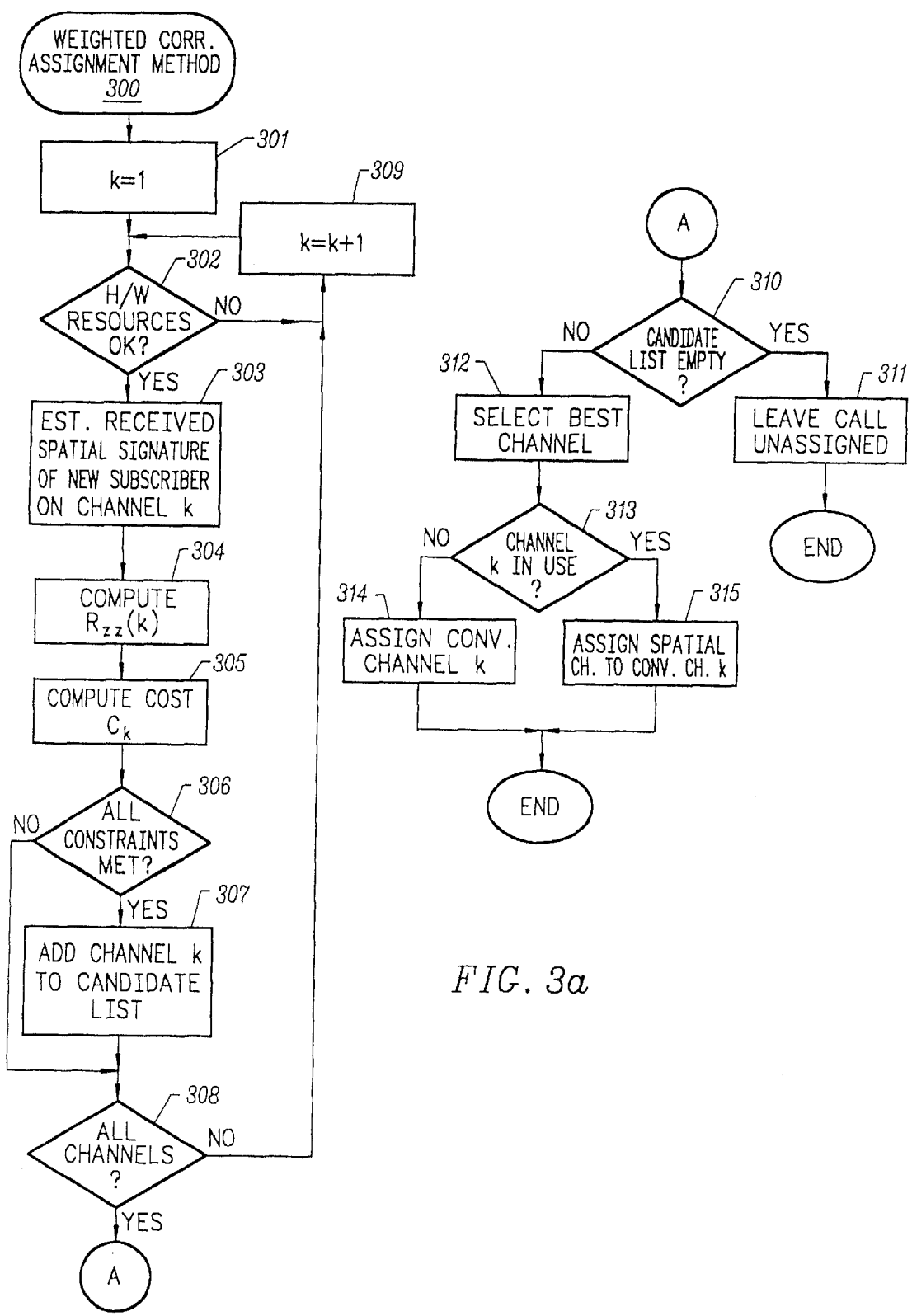
FIG. 3($a$) is a flow diagram of the weighted correlation method for channel assignment.

FIG. 3(a) is a flow diagram of the Weighted Correlation method 300 for channel assignment as previously described. In step 301, the channel index k is initialized. The hardware resources for conventional channel k are checked in step 302, and, if not adequate, the channel index is incremented in step 309 and the process returns to step is 302. If the hardware resources are adequate, the receive spatial signature of the new subscriber on candidate channel k is estimated or else obtained from a database in step 303. The covariance matrix is computed in step 304 using the methods of FIGS. 3(b) or 3(c). The cost function for conventional channel k is computed in step 305 in accordance with Eq. (1), using the spatial signature of the new subscriber from step 303 and the covariance matrix from step 304. In step 306, conventional channel k is checked to see if any additional constraints (e.g., the computed cost is below a prescribed threshold, and/or the uplink maximal crest factor is less than a prescribed threshold) are satisfied and, if not, the process goes to step 308. Otherwise, conventional channel k is added to a candidate list of channels to be considered for assignment in step 307. If, in step 308, all channels have been examined, the process moves to step 310. Otherwise, the process returns to step 309 to increment the channel index and for another iteration through steps 302-308. Step 310 checks if the candidate list has any candidate channels and, if not, the call is not assigned at this base station in step 311, that is, no assignment is made. Otherwise, a best channel k is selected in step 312. In one embodiment, the best channel is any channel with a cost that is less than a prescribed minimum, e.g., the first channel found to have a cost less than the prescribed minimum. (For example, the prescribed minimum can be chosen as a cost level that corresponds to a maximum allowable bit error rate between a subscriber and base station.) In the preferred embodiment, the best channel is the minimal cost channel. If, in step 313, it is determined that selected channel k is not in use within the cell, conventional channel k is assigned to the new subscriber in step 314. If conventional channel k is in use by a subscriber within the cell, a spatial channel, using conventional channel k, is assigned to the new subscriber in step 315.

FIG. 3(b) is a flow diagram for the unstructured method 370 for estimating the sample covariance matrix $\hat{R}_{zz}^{(k)}$. In step 371, measurements are made of the base station received signal vectors, $\{z^{(k)}(i)\}$, from the antenna array for each conventional channel k, and in step 372 the estimate, $\hat{R}_{zz}^{(k)}$, is computed using Eq. (2).

FIG. 3(c) is a flow diagram of the structured method 350 for estimating the sample covariance matrix $\hat{R}_{zz}^{(k)}$. In step 351, the transmit (TX) powers of the active co-channel subscribers for each conventional channel are retrieved from a database or else measured. In step 352, the spatial signatures of co-channel active subscribers are estimated. In step 353, the quantity $A_k^* R_{ss}^{(k)} A_k$ is computed where $A_k$ and $R_{ss}^{(k)}$ are as defined above with respect to Eq. (3). In step 354, the noise-plus-interference covariance matrix, $R_{nn}^{(k)}$, may be estimated by measuring the received noise and intercell interference signal at each antenna element receiver or by using the spatial signatures and transmit powers of all active subscribers outside of the base station cell, if available, as described previously with respect to Eq. (4). The structured estimate of the sample covariance matrix $\hat{R}_{zz}^{(k)}$ is then computed in step 355 by using Eq. (3).

Figure 4:
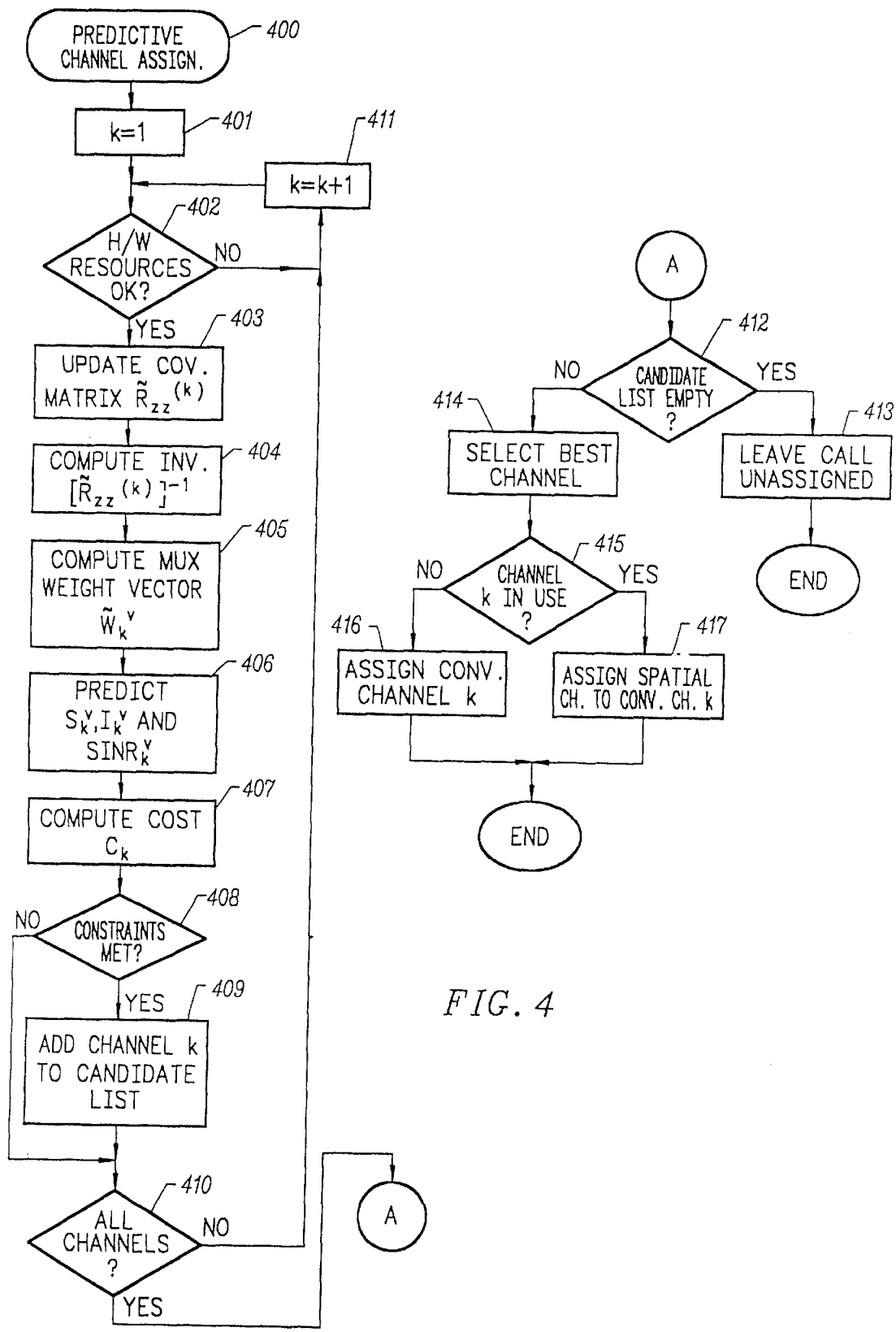
FIG. 4 is a flow diagram of the predicted quality method for channel assignment.

FIG. 4 is a flow diagram of Predictive Channel Assignment Method 400 in which it is assumed that the covariance matrix for each conventional channel k, $\hat{R}_{zz}^{(k)}$, its inverse, $(\hat{R}_{zz}^{(k)})^{-1}$, the new subscriber transmit power, $r_{ss}$, and the new subscriber spatial signature, $a_k$, are known. The channel index is initialized (k=1) in step 401. In step 402, channel k is checked for the required hardware resources and if not adequate, the channel index is incremented in step 411 and the process returns to step 402. Otherwise, the existing covariance matrix, $\hat{R}_{zz}^{(k)}$, is updated to $\tilde{R}_{zz}^{(k)}$ in step 403 by including the predicted effects of the presence of the new subscriber in accordance with Eq. (5). In step 404, the inverse matrix $(\tilde{R}_{zz}^{(k)})^{-1}$ is computed in accordance with Eq. (7) and is then used in step 405 to compute the SDMA demultiplexing weights, $w_k^U$, in accordance with Eq. (6). In step 406, the predicted received uplink power, $S_k^U$, interference, $I_k^U$, and SINR that would result if the new connection were to be assigned to conventional channel k are computed for all conventional channels using Eqs. (8), (9) and (10), respectively. In step 407, a cost is computed (such as $c_k = I_k^U$ or $-SINR_k$). In step 408, conventional channel k is checked to see if any additional constraints are met. In one embodiment, the constraint includes the predicted SINR of the new connection being greater than a prescribed threshold. Additionally, a further constraint may include the predicted SINRs of active calls on conventional channel k, computed using Eqs. (11), (12) and (13), also exceeding some prescribed threshold. An optional constraint of the uplink maximal crest factor being less than some prescribed threshold may also be imposed. If any of the constraints are not satisfied, the process goes to step 410. Otherwise, conventional channel k is added to the candidate list in step 409. In step 410, a check is made as to whether all conventional channels have been processed and, if not, the channel index is incremented in step 411 and the process iterates through steps 402–410. Otherwise, a check is made in step 412 to determine if the candidate list is empty and, if so, the new connection at this base station is left unassigned (step 413). If the candidate list is not empty, a selection is made in step 414 of the channel satisfying the prescribed requirement for best channel (as previously discussed). If, in step 415, it is found that selected channel k is in use within the cell, a spatial channel using conventional channel k is assigned to the new connection in step 417. Otherwise, conventional channel k is assigned to the new connection in step 416.

Figure 5:
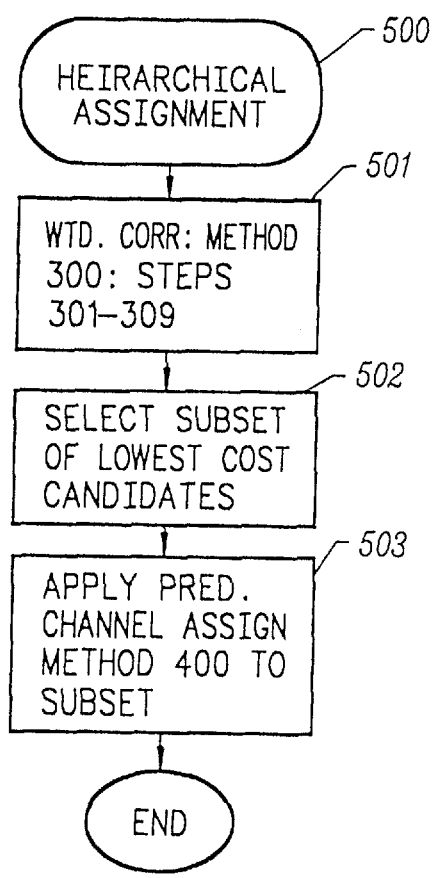
FIG. 5 is a flow diagram for the hierarchical method for channel assignment.

FIG. 5 is a flow diagram for Hierarchical Method 500 for uplink channel assignment. In step 501, the Weighted Correlation Assignment Method 300, steps 301–309 are invoked for producing a set of candidate channels together with their costs. In step 502, a subset of low cost conventional channels is selected from the set of all candidates. In step 503, Predictive Assignment Method 400 is applied to the subset of conventional channels provided by step 502 for selecting the best conventional channel for assignment.

Figure 6:
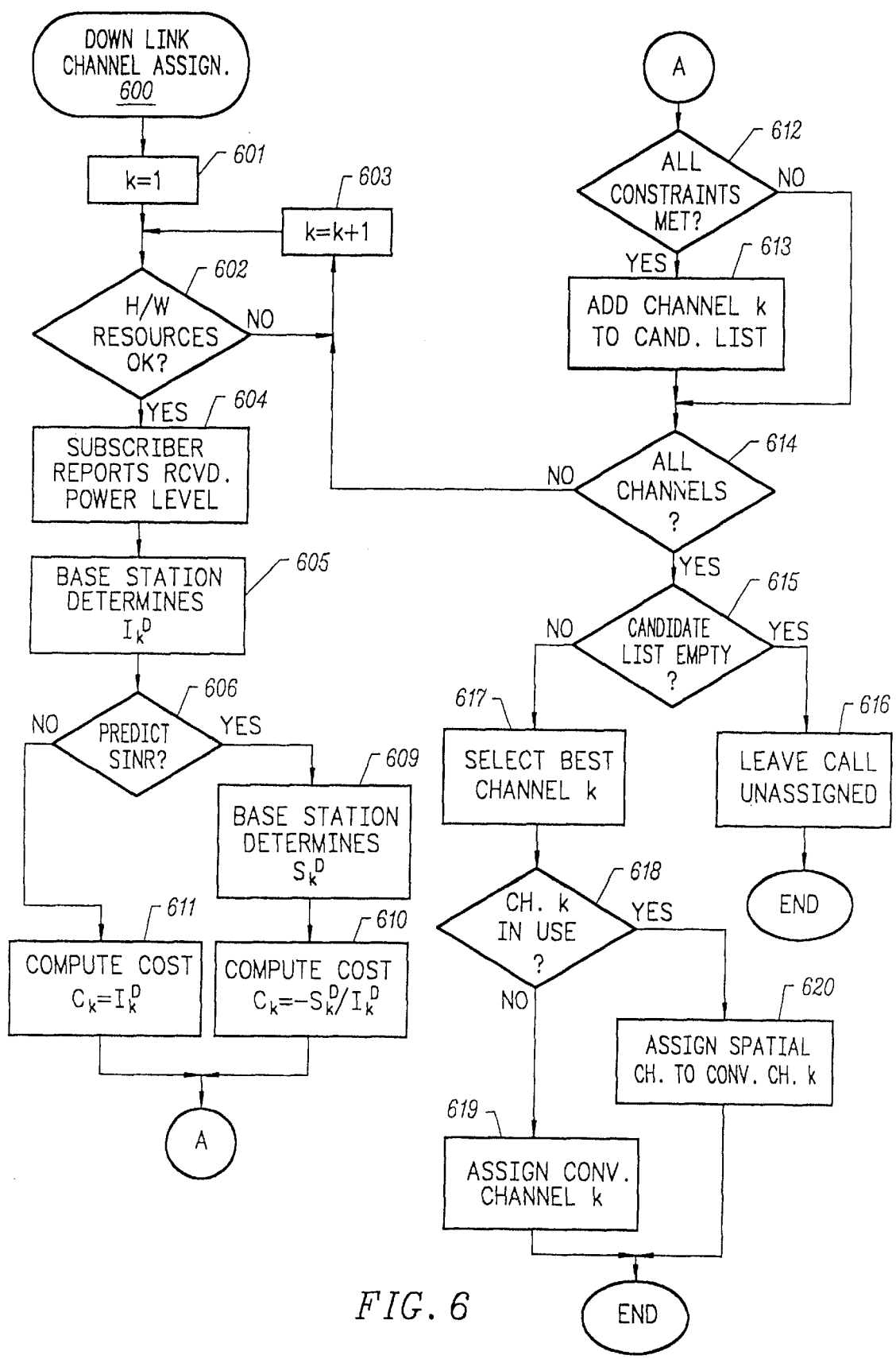
FIG. 6 is a flow diagram for the downlink predictive channel assignment method.

FIG. 6 is a flow diagram of Downlink Channel Assignment Method 600, as described previously. The channel index, k, is initialized in step 601. In step 602, a determination is made as to whether or not channel k has the required hardware resources, and, if not, the process increments the channel index in step 603 and then returns to step 602 for another iteration. Otherwise, in step 604, the new subscriber reports received powers level for each conventional channel k to the base station. The measurement of the received power may optionally be performed during a test interval, as previously described. The base station, in step 605, determines the downlink interference-plus-noise power level, $I_k^D$, by any of the three methods described earlier. In step 606, an option is exercised: if downlink channel assignment is to be based on predicting SINR levels, the process moves to step 609; otherwise, the process moves to step 611. The base station, in step 609 estimates the downlink received power level, $S_k^D$, from Eq. (14) using the spatial signature $a_k^D$ and multiplexing weights $w_k^D$ of the new subscriber on conventional channel k. The cost is computed in step 610 as $c_k = -S_k^D/I_k^D$, i.e., the negative of $SINR_k^D$ defined in Eq. (19). If the SINR option is not selected in step 606, a cost based on interference-plus-noise is computed, i.e., $c_k = I_k^D$. In step 612, a determination is made as to whether all constraints are satisfied by channel k. In one embodiment, the constraint includes the predicted SINR of the new connection being greater than a prescribed threshold. Additionally, a further constraint may include the predicted SINRs of active calls on conventional channel k also exceeding some prescribed threshold. An optional constraint may also be imposed of the downlink maximal crest factor being less than some prescribed threshold. See the above equations for calculation of $SINR_{k,i}^D$ for details for the different alternatives for the determination of step 612. If in step 612, any of the constraints are not satisfied, the process goes to step 614. Otherwise, the process goes to step 613 where channel k is added to the candidate channel list. If, in step 614, it is determined that all channels have not been considered, the process goes to step 603. Otherwise, a check is made in step 615 to determine if the candidate list is empty and, if so, the new call is left unassigned at this base station (step 616). If the candidate list is not empty, a selection is made in step 617 of the channel satisfying the prescribed requirement for best channel (as previously discussed). If, in step 618, it is found that selected channel k is in use within the cell, a spatial channel using conventional channel k is assigned to the new subscriber in step 620. Otherwise, conventional channel k is assigned to the new subscriber in step 619.

Because many practical systems impose a fixed relationship between the uplink and downlink of a full-duplex conventional channel assignment, it is necessary to define a method for joint uplink-downlink channel assignment. This is accomplished by selecting a subset of those uplink and downlink pairs that satisfy both the uplink assignment constraints (FIGS. 3(a–c), 4, and 5, and as previously described) and the downlink assignment constraints (FIG. 6 and as previously described). For example, this may mean selecting those full-duplex channels with estimated uplink and downlink SINRs that are above the prescribed thresholds and that satisfy the crest factor constraint. From this subset of uplink/downlink pairs, an uplink cost, $c_k^U$, and a downlink cost, $c_k^D$, is computed for each pair and then combined to form a single uplink/downlink cost. As is well known to those skilled in the art, there are many possible ways to combine the individual uplink or downlink costs of a given pair of uplink and downlink costs. For example, the weighted sum $(c_k^U + \lambda c_k^D)$, where $\lambda$, is relative a scaling factor, can be used for the joint cost, or the weighted product $c_k^U (c_k^D)^\gamma$, where $\gamma$ is a relative exponential weighting factor, can be used. A reasonable joint cost function, the uniformly weighted ($\gamma=1$) joint product cost function is $$c = c_k^U \cdot c_k^D \qquad \text{Eq. 26}$$

(Because of the many possible choices available for combining the uplink and downlink costs, it is noted that the concept of creating a joint cost is important rather than the specific form of the joint cost function selected.) Having created a joint cost for each full-duplex channel pair in the selected subset, the full-duplex channel with either an acceptably low joint cost or the minimum joint cost is selected for assignment.

All of the channel assignment methods previously described may be applied to either a set of candidate conventional channels associated with any particular base station or else a set of candidate conventional channels associated with a multiplicity of base stations. In the latter embodiment, the channel assignment method automatically performs the selection of a base station for the new connection in the process of selecting a conventional channel for the call. This can be achieved either by assigning the channel and associated base station that provide the best cost from all candidate channels at all associated base stations or sequentially carrying out the channel assignment at candidate channels until a conventional channel is assigned.

Channel reassignment may be necessary if a newly admitted call experiences communication quality problems, or if an in-progress call experiences an unacceptable reduction in quality due to a change in its RF environment. The channel reassignment process is the same as for initial channel assignment, except that the conventional channel the subscriber wishes to be reassigned from is removed from the list of candidate channels prior to the selection process. With this modification, all of the methods thus described for channel assignment are also applicable to channel reassignment.

Figure 7:
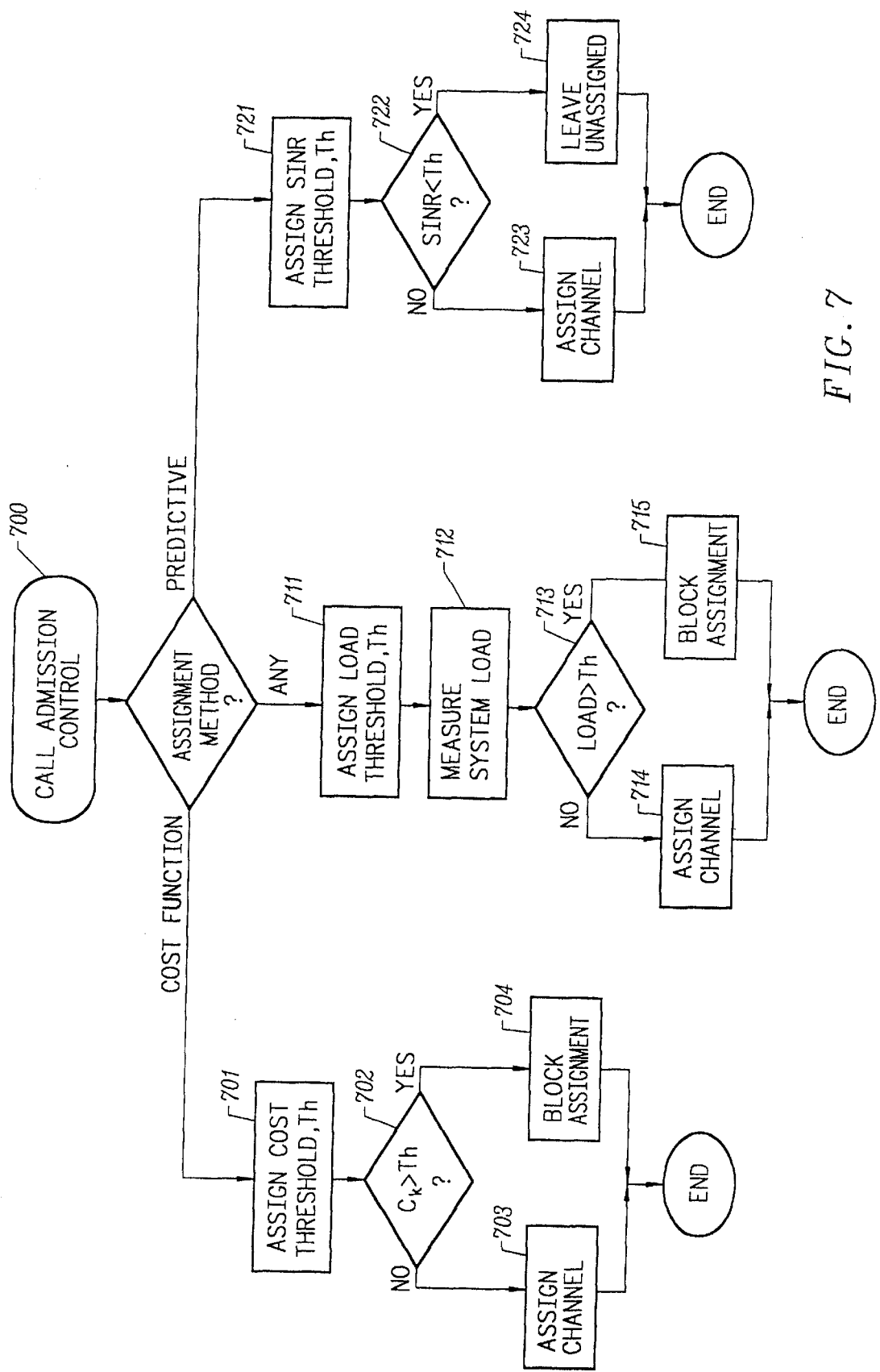
FIG. 7 is a flow diagram for three methods of call admission control.

Call admission control is the decision process for admitting or not admitting a new connection. It may be necessary to not assign a new connection if the system load is very high such that admitting a new connection may have a significant negative impact on the quality of the existing connections in the system. For any of the previously described channel assignment methods, the determination as to whether the assignment of a new connection to any particular channel will have a significant negative impact on existing connections can be done by checking the constraints of the particular channel assignment method. If the constraints can be met for the new connection on conventional channel k, then this channel is a candidate for assignment. Otherwise, channel k is not permissible for assignment. Call admission control is accomplished by checking the constraints for all or a subset of conventional channels, and if no channel satisfying the constraints of the particular channel assignment method can be found, then not assigning the new connection. Hence, all of the previously described channel assignment methods are also applicable for admission control. Additionally, an alternate method which can be applied independently of any channel selection method may also be used. FIG. 7, a flow diagram for Call Admission Control Method 700, summarizes the different methods.

The first method, appropriate when the Weighted Correlation channel assignment is used, begins at step 701 where a cost threshold value is established which is compared with the expected cost, $c_k$, of a selected channel k, in step 702. If the cost threshold is not exceeded, channel k is assigned in step 703. If the cost threshold is exceeded, the assignment of channel k is left unassigned in step 704.

The second method, appropriate when the Uplink Predicted Quality or Downlink Predictive method for channel assignment is used, begins at step 721 (FIG. 7) where a SINR threshold level is assigned. In step 722, the SINR of the conventional channel selected for assignment is compared with the threshold and, if less than the threshold, the selected channel is assigned in step 723. Otherwise, the selected channel assignment is left unassigned in step 724.

The third method, appropriate for any assignment method and SDMA and non-SDMA systems, begins at step 711 of FIG. 7 where a load threshold is assigned. In step 712, the cell system load is measured and then, in step 713, compared with the load threshold. If load threshold is not exceeded, the selected channel is assigned in step 714. If the load threshold is exceeded, all conventional channels are left unassigned in step 715 until the system load falls below the load threshold value. A method for measuring system load is by monitoring the rate of intercell handoffs, or the rate of channel reassignments (intracell handoffs), that is experienced by the cell. A moving time average of the rate of handoffs to other cells, or the rate of channel reassignments within the cell, can be used for smoothing the stochastic behavior of these events.

FIG. 7 describes the assignment locally, that is, at one base station. Recalling that overall assignment may be carried out either sequentially or by "joint optimization," when the assignment is carried out sequentially among all candidate conventional channels at all associated base stations, steps 704, 715, and 724 would each be followed by a channel assignment process at the next base station, and such a process would be repeated at different base stations until a conventional channel and associated base station are found, or the call is left unassigned. When the assignment is carried out by joint optimization, that is, by assigning the channel and associated base station that provide the best cost from all candidate channels at all associated base stations, then the assignment steps in FIG. 7 would be modified to carry out assignment of both the conventional channel and the associated base station, and how to carry out such modification to the flow diagram of FIG. 7 would be clear to those of ordinary skill in the art.

The methods described above were, for sake of clarity in the description, limited to specific wireless cellular communication systems and embodiments but, for those of ordinary skill in the art, the application of these inventions to other similar communication systems, such as wireless local area networks, and to other variations on the embodiment will become evident to those practicing the art from the descriptions provided without departing from the spirit and scope of the invention which should only be limited as set forward in the claims that follow.

What is claimed is:

1. A channel assignment method for use in a wireless communication system for establishing an uplink connection between a subscriber station requesting an uplink connection and a base station, and for reassigning an existing connection to a subscriber station, the base station including an array of antenna elements and SDMA processing means, the SDMA processing means enabling one or more subscriber stations to communicate on the uplink with the base station on the same conventional channel, each subscriber station communicating on the same conventional channel communicating on a spatial channel of said same conventional channel, the method comprising:

(a) for each conventional uplink channel, computing a cost according to a cost function that is indicative of the interference level that may be realized by assigning the subscriber station to the conventional uplink channel, the cost function being a function of spatial properties of the subscriber station for communicating with the base station; and (b) assigning to the subscriber station one of the conventional uplink channels with a cost that is less than a prescribed cost threshold.

2. The method of claim 1 wherein the SDMA processing means enables more than one subscriber station to communicate on the uplink with the base station on the same conventional channel, the method further comprising the step of assigning a new spatial channel to the subscriber station on the assigned conventional channel if the assigned conventional channel is in use by the base station for communicating on the unlink with a second subscriber station on an existing spatial channel.

3. The method of claim 1 wherein the assigned conventional channel has a minimal cost.

4. The method of claim 1 wherein the SDMA processing means processes uplink signals from a particular subscriber station according to a set of uplink demultiplexing weights for that particular subscriber station, wherein the spatial properties are the elements of the uplink spatial signature of the subscriber station, and wherein the cost function is a quadratic function of the uplink spatial signature of the subscriber station.

5. The method of claim 4 wherein the cost function is a weighted quadratic function of the uplink spatial signature of the subscriber station.

6. The method of claim 5 wherein the cost function is weighted by a sample covariance matrix of the base station antenna array received vector signal for a conventional channel.

7. The method of claim 1 wherein the SDMA processing means processes a uplink signals from a particular subscriber station according to a set of uplink demultiplexing weights for that particular subscriber station, wherein the spatial properties are the elements of the uplink spatial signature of the subscriber station, and wherein the cost function, $c_k$, is computed as $$c_k = a_k^* \hat{R}_{zz}^{(k)} a_k$$

where $a_k$ is the conventional channel k uplink spatial signature of the subscriber station, and $\hat{R}_{zz}^{(k)}$ is a sample covariance matrix of the base station antenna array response on channel k.

8. The method of claim 7 wherein the sample covariance matrix, $\hat{R}_{zz}^{(k)}$, is estimated as an average from the received signal vectors, $z^{(k)}(i)$, at the base station antenna array on conventional channel k, where i is a received signal vector sample index, as $$\hat{R}_{zz}^{(k)} = \frac{1}{n} \sum_{i=1}^{n} z^{(k)}(i) z^{(k)*}(i).$$

9. The method of claim 7 wherein the sample covariance matrix, $\hat{R}_{zz}^{(k)}$, is estimated as $$\hat{R}_{zz}^{(k)} = A_k R_{ss}^{(k)} A_k^* + R_{nn}$$

where $A_k$ is a collection of spatial signatures formed by column-wise concatenation of all spatial signatures of subscriber stations actively communicating with the base station on conventional channel k, $R_{ss}^{(k)}$ is a covariance matrix whose diagonal elements are average transmit powers of subscribers communicating with the base station, and $R_{nn}^{(k)}$ is a noise-plus-interference covariance matrix of the base station antenna array received signals.

10. The method of claim 9 wherein $R_{nn}^{(k)}$ is estimated as $$R_{nn}^{(k)} = A_k^0 R_{s_0 s_0}^{(k)} A_k^{0*} + \sigma^2 I$$

where $A_k^0$ is a collection of spatial signatures of subscriber stations not communicating with the base station and is formed by column-wise concatenation of the spatial signatures on conventional channel k, and $R_{s_0 s_0}^{(k)}$ is a covariance matrix whose diagonal elements are the average transmit signal powers of subscriber stations not communicating with the base station, $\sigma^2$ is an estimated receiver noise power, and I is an identity matrix.

11. The method of claim 1 wherein the cost function is based on at least one uplink received signal quality factor selected from the group consisting of a received uplink signal level, a signal-to-interference-plus-noise ratio, an interference-plus-noise level, an intermodulation noise level, and a crest factor.

12. A channel assignment method for use in a wireless communication system for establishing an uplink connection between a subscriber station requesting an uplink connection and a base station, and for reassigning an existing connection to a subscriber station, the base station including an array of antenna elements and SDMA processing means, the SDMA processing means enabling one or more subscriber stations to communicate on the uplink with the base station on the same conventional channel, each subscriber station communicating on the same conventional channel communicating on a spatial channel of said same conventional channel, the method comprising:

(a) for each conventional uplink channel, computing a predicted cost according to a cost function, the cost function for a particular conventional channel based on the predicted received signal quality on the particular conventional channel, the received signal quality on a conventional uplink channel predicted using a model of the wireless communication system for predicting signal quality based upon existing connections, the computing using spatial properties of the subscriber station for communicating with the base station; and (b) assigning to the subscriber station one of the conventional uplink channels that has a predicted cost that is less than a prescribed cost level.

13. The method of claim 12 wherein the SDMA processing means enables more than one subscriber stations to communicate on the uplink with the base station on the same conventional channel, the method further comprising the step of assigning a new spatial channel to the subscriber station on the assigned conventional channel if the assigned conventional channel is in use by the base station for communicating on the uplink with a second subscriber station on an existing spatial channel.

14. The method of claim 12 wherein the predicted received signal quality is based on predicting an uplink interference-plus-noise level.

15. The method of claim 12 wherein the predicted received signal quality is based on predicting a received signal to interference-plus-noise ration (SINR).

16. The method of claim 12 wherein the prescribed cost level corresponds to a minimal acceptable received bit error rate.

17. The method of claim 12 wherein the assigned conventional uplink channel has a predicted minimal cost level.

18. The method of claim 12 wherein assigning step (b) further requires that the assigned conventional channel have a SINR level that is greater than a prescribed minimal value.

19. The method of claim 12 wherein the spatial properties are the elements of the uplink spatial signature of the subscriber station, and wherein step (a) for computing further comprises:

(i) updating a covariance matrix of received uplink signals, $\hat{R}_{zz}^{(k)}$, representative of received uplink signals at the base station before assigning channel k by predicting an updated covariance matrix, $\tilde{R}_{zz}^{(k)}$, representative of received uplink signals that would result if the new subscriber were to be assigned to channel k, where $\tilde{R}_{zz}^{(k)} = \hat{R}_{zz}^{(k)} + a_k$, $r_{ss}^{(k)} + a_k$, $a_k^*, a_k$ is the uplink spatial signature of the new subscriber on conventional channel k, and $r_{ss}^{(k)}$ is a scalar representative of the new subscriber transmitted power on conventional channel k; and (ii) computing an uplink spatial demultiplexing weight vector, $\tilde{w}_k^U$, where $\tilde{w}_k^U = (\tilde{R}_{zz}^{(k)})^{-1} a_k r_{ss}^{(k)}$.

20. The method of claim 19 wherein the updated inverse covariance matrix, $(\tilde{R}_{zz}^{(k)})^{-1}$, is obtained from the expression $$(\tilde{R}_{zz}^{(k)})^{-1} = (\hat{R}_{zz}^{(k)})^{-1} - (\hat{R}_{zz}^{(k)})^{-1} a_{kk}^* (\hat{R}_{zz}^{(k)})^{-1} / ((1/r_{ss}^{(k)}) + a_k^* (\hat{R}_{zz}^{(k)})_{-1} a_k).$$

21. The method of claim 12 wherein the spatial properties are the elements of the uplink spatial signature of the subscriber station, and wherein step (a) for computing the predicted uplink received signal quality level on channel k further comprises:

(iii) predicting uplink received signal power as $S_k^U = |\tilde{w}_k^{U*} a_k|^2 r_{ss}^{(k)}$;

(iv) predicting uplink interference-plus-noise power for the new subscriber as $I_k^U = \tilde{w}_k^{U*} \hat{R}_{zz}^{(k)} \tilde{w}_k^U$; and (v) predicting the uplink SINR for channel k as $SINR_k = S_k^U / I_k^U$ where $\hat{R}_{zz}^{(k)}$ is the sample covariance matrix of the base station antenna array response on conventional channel k, $a_k$ is the uplink spatial signature of the new subscriber on conventional channel k, $r_{ss}^{(k)}$ is a scalar representative of the new subscriber transmitted power on conventional channel k, and $\tilde{w}_k^U$ is the uplink spatial demultiplexing weight vector for channel k.

22. The method of claim 12 further comprising a constraint for only permitting assignment of a conventional channel if the assignment results in a predicted uplink SINR for all active subscribers using the conventional channel which exceeds a prescribed SINR level.

23. The method of claim 12 wherein the predicted cost is based on at least one set of predicted uplink received signal quality factors selected from the group consisting of received uplink signal levels, interference-plus-noise levels, intermodulation noise levels, and crest factor values.

24. A channel assignment method for use in a wireless communication system for establishing an uplink connection between a new subscriber station requesting an uplink connection and a base station, and for reassigning an existing connection to a subscriber station the base station including an array of antenna elements and SDMA processing means, the method comprising:

(a) computing a first cost for each conventional uplink channel according to a first cost function that is indicative of the uplink interference level that may be realized by assigning the new subscriber station to said each conventional uplink channel, the computing including using spatial properties of the subscriber station for communicating with the base station;

(b) selecting a subset of conventional uplink channels, the subset consisting of the conventional uplink channels with a first cost that is less than a prescribed first cost level;

(c) for each conventional uplink channel of the subset, computing a second cost according to a second cost function, the second cost function for a particular conventional channel based on the predicted received signal quality on the particular conventional channel, the received signal quality on a conventional uplink channel predicted using a model of the wireless communication system for predicting signal quality based upon existing connections; and (d) assigning to the subscriber station one of the conventional uplink channels of the subset that has a second cost that is less than a prescribed second cost level.

25. The method of claim 24 wherein the SDMA processing means enables more than one subscriber stations to communicate on the uplink with the base station on the same conventional channel, each subscriber station communicating on the same conventional channel communicating on a different spatial channel of said same conventional channel, the method further comprising the step of assigning a new spatial channel to the subscriber station on the assigned conventional uplink channel if the assigned conventional uplink channel is in use by the base station for communicating on the uplink with a second subscriber station on an existing spatial channel.

26. The method of claim 24 wherein the prescribed first and second cost levels correspond to a prescribed maximal received uplink bit error rate level.

27. The method of claim 24 wherein step (d) of assigning further requires that the assigned conventional channel have a SINR level that is higher than a prescribed SINR level.

28. The method of claim 24, wherein the wireless communication system uses power control when establishing an uplink connection, and wherein in step d), a conventional uplink channel is selected for assignment that has a SINR level greater than a prescribed SINR level.

29. The method of claim 24 wherein is based on at least one set of uplink received signal quality factors selected from the following list: received uplink signal power levels, interference-plus-noise levels, intermodulation noise levels, and crest factor values.

30. A channel assignment method for use in a wireless communication system for establishing a downlink connection between a base station and a subscriber station, the base station including an array of antenna elements and SDMA processing means, the SDMA processing means enabling the base station to communicate on the downlink with more than one subscriber station on the same conventional channel, each subscriber station on the same conventional channel being communicated to on a different spatial channel of said same conventional channel, the method comprising:
  (a) estimating, at the base station, the downlink received interference-plus-noise level that would result for each existing conventional channel if the subscriber was assigned to a given conventional downlink channel;
  (b) computing, at the base station, a cost for each existing conventional downlink channel using a prescribed cost function based on the estimated downlink received interference-plus-noise levels; and
  (c) assigning, at the base station, the subscriber station to a conventional downlink channel that has a computed cost that is less than a prescribed value,
  the method further comprising the step of assigning a spatial channel to the subscriber station on the assigned conventional downlink channel if the assigned conventional downlink channel is in use by the base station for communicating on the downlink with a second subscriber station on an existing spatial channel.

31. The method of claim 30 wherein assigning step (c) further comprises selecting a downlink channel that has a minimal computed cost.

32. The method of claim 30 wherein estimating step (a) further comprises:
  (i) measuring, at the subscriber station, downlink received signal levels on each downlink channel and reporting the downlink received signal levels to the base station;
  (ii) estimating, at the base station, the downlink received interference-plus-noise levels from the reported downlink signal levels of measuring step (i).

33. The method of claim 32 wherein measuring step (i) of estimating step (a) further comprises each subscriber station, when not actively engaged in a call, periodically measuring the downlink received signal level on each conventional channel and reporting the downlink received signal levels to the base station.

34. The method of claim 32 wherein the downlink received interference-plus-noise levels are estimated as being the reported downlink received signal levels.

35. A channel assignment method for use in a wireless communication system for establishing a downlink connection between a base station and a subscriber station, the base station including an array of antenna elements and SDMA processing means, the SDMA processing means processing a downlink signal for a particular subscriber station according to a set of downlink multiplexing weights for that particular subscriber station, the method comprising:
  (a) estimating, at the base station, the downlink received interference-plus-noise level that would result for each existing conventional channel if the subscriber was assigned to a given conventional downlink channel;
  (b) computing, at the base station, a cost for each existing conventional downlink channel using a prescribed cost function based on the estimated downlink received interference-plus-noise levels; and
  (c) assigning, at the base station, a conventional downlink channel that has a computed cost that is less than a prescribed value,
  wherein step (a) for estimating downlink received interference-plus-noise levels on each downlink channel comprises the following steps:
  (i) adjusting, at the base station, each existing subscriber's downlink multiplexing weights as if the new subscriber was assigned to a given conventional channel;
  (ii) measuring, at the new subscriber station, the downlink received signal level on the given channel after step (i) and reporting the downlink received signal level to the base station;
  (iii) predicting, at the base station, a downlink interference-plus-noise level from the downlink received signal level of step (ii); and
  (iv) readjusting, at the base station, each existing subscriber's downlink multiplexing weights as if the new subscriber was not assigned to the given conventional channel.

36. A channel assignment method for use in a wireless communication system for establishing a downlink connection between a base station and a subscriber station, the base station including an array of antenna elements and SDMA processing means, the method comprising:
  (a) estimating, at the base station, the downlink received interference-plus-noise level that would result for each existing conventional channel if the subscriber was assigned to a given conventional downlink channel;
  (b) computing, at the base station, a cost for each existing conventional downlink channel using a prescribed cost function based on the estimated downlink received interference-plus-noise levels; and
  (d) assigning, at the base station, a conventional downlink channel that has a computed cost that is less than a prescribed value,
  wherein step (a) for estimating a downlink received interference-plus-noise level, $I_k$, for each existing channel k comprises, modeling the downlink received interference-plus-noise level, $I_k$, as a sum of the noise contribution, $N_k$, and a predicted second interference signal level that would result if the new subscriber was to be assigned to channel k, estimating the noise contribution $N_k$ as a signal level difference between a measured downlink received signal level, $P_k$, on channel k and a computed first interference signal level due to all base stations using channel k.

37. The method of claim 36 wherein the SDMA Processing means processes a downlink signal for a particular subscriber station according to a set of downlink multiplexing weights for that particular subscriber station, wherein each subscriber station has a downlink spatial signature, and wherein the computed first interference signal level is computed as $$\sum_j \|W_{k,j}^{D*} a_k^{D,j}\|^2,$$

where $W_{k,j}^{D*} = S_{k,j} A_{k,j}^{\dagger}$, $S_{k,j}$ is a diagonal matrix of base station j transmitted signal amplitudes, $A_{k,j}$ is a column-wise concatenated matrix of known downlink spatial signatures at base station j for the subscriber stations on conventional channel k, $A_{k,j}^{\dagger}$ represents the pseudoinverse of $A_{k,j}$, and $a_k^{D,j}$ is the downlink spatial signature for the new subscriber station on conventional channel k from base station j.

38. The method of claim 36 wherein the SDMA processing means processes a downlink signal for a particular subscriber station according to a set of downlink multiplexing weights for that particular subscriber station, wherein each subscriber station has a downlink spatial signature, and wherein the predicted second interference signal level for channel k is computed as $$\sum_j \|\tilde{W}_{k,j}^{D*} a_k^{D,j}\|^2,$$

where $$\begin{bmatrix} \tilde{W}_{k,j}^{D*} \\ w^* \end{bmatrix} = \tilde{S}_{k,j}[A_{k,j} a_k^{D,j}]^\dagger,$$

† represents a pseudoinverse operation, $\tilde{S}_{k,j}$ is a diagonal matrix of transmit signal amplitudes, $A_{k,j}$ is a column-wise concatenated matrix of known downlink spatial signatures for the subscriber stations on conventional channel k at base station j, $a_k^{D,j}$ is a downlink spatial signature for conventional channel k from base station j for the new subscriber station on conventional channel k, and $w^*$ is the bottom row of matrix $\tilde{S}k,j[A_{k,j} a_k^{D,j}]^\dagger$.

39. A channel assignment method for use in a wireless communication system for establishing a downlink connection between a base station and a subscriber station, the base station including an array of antenna elements and SDMA processing means, the method comprising:
  (a) estimating, at the base station, the downlink received interference-plus-noise level that would result for each existing conventional channel if the subscriber was assigned to a given conventional downlink channel;
  (b) computing, at the base station, a cost for each existing conventional downlink channel using a prescribed cost function based on the estimated downlink received interference-plus-noise levels; and
  (c) assigning, at the base station, a conventional downlink channel that has a computed cost that is less than a prescribed value, and further comprising a step for assigning a selected downlink conventional channel) only if it is expected to result in an acceptable downlink received signal quality for each active subscriber using the selected conventional channel based upon at least one downlink quality factor selected from a group consisting of: predicted cost; predicted total base station transmitter power; predicted intermodulation distortion level; predicted interference-plus-noise level; and predicted signal to interference-plus-noise ratio.

40. The method of claim 39 wherein the predicted intermodulation distortion level is obtained by computing a crest factor for each [downlink ]conventional downlink channel, the crest factor value being indicative of an intermodulation distortion level that would result if a given conventional downlink channel were to be assigned.

41. A channel assignment method for use in a wireless communication system for establishing a downlink connection between a base station and a subscriber station, the base station including an array of antenna elements and SDMA processing means, the method comprising:
  (a) estimating, at the base station, the downlink received SINR level that would result for each existing conventional channel if the subscriber station were to be assigned to a given conventional downlink channel, the estimating using spatial information of the new subscriber;
  (b) computing, at the base station, a cost for each existing conventional downlink channel using a prescribed cost function based on the estimated downlink received SNR level; and
  (c) assigning, at the base station, a downlink channel that has a computed cost that is less than a prescribed value,
  the method further comprising the step of assigning a spatial channel to the subscriber station on the assigned conventional downlink channel if the communications system supports and the SDMA processing means enables communication on more than one spatial channel on the same conventional downlink channel, and if the assigned conventional downlink channel is in use by the base station for communicating on the downlink with a second subscriber station on an existing spatial channel.

42. The method of claim 41 wherein the SDMA processing means enables more than one subscriber stations to communicate on the downlink with the base station on the same conventional downlink channel, each subscriber station on the same conventional channel being communicated to on a different spatial channel of said same conventional channel, the method further comprising the step of assigning a new spatial channel to the subscriber station on the assigned conventional downlink channel if the assigned conventional downlink channel is in use by the base station for communicating on the downlink with a second subscriber station on an existing spatial channel.

43. The method of claim 41 wherein the SDMA processing means processes a downlink signal for a particular subscriber station according to a set of downlink multiplexing weights for that particular subscriber station, wherein each subscriber station has a downlink spatial signature, and wherein the prescribed cost function of computing step (b) is based on $SINR_k^D$, an estimated downlink signal to interference-plus-noise ratio for each channel k, where $SINR_k^D = S_k^D / I_k^D$, $S_k^D = |w_k^{D*} a_k^D|^2$, $w_k^D$ is the downlink multiplexing weight for the new subscriber on channel k, $a_k^D$ is the downlink spatial signature of the new subscriber on channel k, and $I_k^D$ is an estimated k interference-plus-noise level.

44. The method of claim 41 wherein assigning step (c) further comprises selecting a downlink channel that has a minimal computed cost.

45. The method of claim 41 wherein estimating step (a) further comprises:
  (i) measuring, at the subscriber station, downlink received signal levels on each downlink channel and reporting the downlink received signal levels to the base station;
  (ii) estimating, at the base station, the downlink received interference-plus-noise level from the reported downlink signal levels of measuring step (i).

46. The method of claim 45 wherein measuring step (i) of estimating step (a) further comprises each subscriber station, when not actively engaged in a call, periodically measuring the downlink received signal level on each conventional channel and reporting the downlink received signal levels to the base station.

47. The method of claim 41 wherein the SDMA processing means processes a downlink signal for a particular subscriber station according to a set of downlink multiplexing weights for that particular subscriber station, and wherein step (a) for estimating downlink received interference-plus-noise levels on each downlink channel comprises the following steps:

(i) adjusting, at the base station, each existing subscriber's downlink multiplexing weights as if the new subscriber was assigned to a given conventional channel;

(ii) measuring, at the new subscriber station, the downlink received signal level on the given channel after adjusting step (i) and reporting the downlink received signal level to the base station;

(iii) predicting, at the base station, a downlink interference-plus-noise level from the downlink received signal level of measuring step (ii); and (iv) readjusting, at the base station, each existing subscriber's downlink multiplexing weights as if the new subscriber were not assigned to the given conventional channel.

48. The method of claim 41 wherein step (a) for estimating a downlink received interference-plus-noise level, $I_k$, for each existing channel k comprises, modeling the downlink received interference-plus-noise level, $I_k$, as a sum of the noise contribution, $N_k$, and a predicted second interference signal level that would result if the new subscriber was to be assigned to channel k, estimating the noise contribution $N_k$ as a signal level difference between a measured downlink received signal level, $P_k$, on channel k and a computed first interference signal level due to all base stations using channel k.

49. The method of claim 48 wherein the SDMA Processing means processes a downlink signal for a particular subscriber station according to a set of downlink multiplexing weights for that particular subscriber station, wherein each subscriber station has a downlink spatial signature, and wherein the computed first interference signal level is computed as $$\sum_j \|\tilde{W}_{k,j}^{D*} a_k^{D,j}\|^2,$$

where $W_{k,j}^{D*} = S_{k,j}^{D*} = S_{k,j} A_{k,j}^{\dagger}$, $S_{k,j}$ is a diagonal matrix of base station j transmitted signal amplitudes for conventional channel k, $A_{k,j}$ is a column-wise concatenated matrix of known spatial signatures at base station j for the subscriber stations on conventional channel k, $A_{k,j}^{\dagger}$ represents the pseudoinverse of $A_{k,j}$, and $a_k^{D,j}$ is a downlink spatial signature for the new subscriber station on conventional channel k from base station j.

50. The method of claim 48 wherein the SDMA processing means processes a downlink signal for a particular subscriber station according to a set of downlink multiplexing weights for that particular subscriber station, wherein each subscriber station has a downlink spatial signature, and wherein the predicted second interference signal level for channel k is computed as $$\sum_j \|\tilde{W}_{k,j}^{D*} a_k^{D,j}\|^2,$$

where $$\begin{bmatrix} \tilde{W}_{k,j}^{D*} \\ w^* \end{bmatrix} = \tilde{S}_{k,j}[A_{k,j} a_k^{D,j}]^{\dagger},$$

† represents a pseudoinverse operation, $\tilde{S}_{k,j}$ is a diagonal matrix of transmit signal amplitudes, $A_{k,j}$ is a column-wise concatenated matrix of known downlink spatial signatures at base station j for the subscriber stations on conventional channel k, $a_k^{D,j}$ is a downlink spatial signature for the new subscriber station on conventional channel k from base station j, and $w^*$ is the bottom row of matrix $\tilde{S}_{k,j}[A_{k,j} a_k^{D,j}]^{\dagger}$.

51. The method of claim 41 further comprising a step for assigning a selected conventional downlink channel only if it is expected to result in an acceptable downlink received signal quality for each active channel based upon at least one downlink quality factor selected from a group consisting of: cost for new call; total base station transmitter power; predicted intermodulation distortion level; predicted interference-plus-noise level on each active channel; and predicted signal to interference-plus-noise ratio on each active channel.

52. The method of claim 51 wherein the predicted intermodulation distortion level is obtained by computing a crest factor for each conventional downlink channel, the crest factor value being indicative of an intermodulation distortion level that would result if a given conventional downlink channel were to be assigned.

53. In a wireless communication system, the system including a base station and one or more subscriber stations, the base station including an array of antenna elements and SDMA processing means, a method for assignment of a full-duplex channel in which a duplex channel is selected from a set of duplex channels wherein each duplex channel of the set provides acceptable quality uplink communications, and the downlink channel assignment is made in accordance with existing rules of the system, the method comprising:

(a) computing a cost for each conventional uplink channel according to a cost function that is indicative of a lack of communications quality expected interference level that may be realized by assigning the subscriber station to the conventional uplink channel, the cost function being a function of spatial properties of the subscriber station for communicating with the base station;

(b) assigning a conventional uplink channel by selecting a conventional uplink channel with a cost less than a prescribed cost level; and (c) selecting a downlink channel in accordance with existing rules of the communication system.

54. The method of claim 53 wherein the full duplex channel assignment is made in accordance with the Personal Handyphone System (PHS) standard.

55. In a wireless communication system, the system including a base station and one or more subscriber stations, the base station including an array of antenna elements and SDMA processing means, the SDMA processing means enabling the base station to communicate on the downlink with more than one subscriber station on the same conventional channel, each subscriber station on the same conventional channel being communicated to by the base station on a different spatial channel of said same conventional channel, a method for assignment of a full-duplex channel in which a duplex channel is selected from a set of duplex channels wherein each duplex channel of the set provides acceptable quality downlink communications, and the uplink channel assignment is made in accordance with existing rules of the system, the method comprising:

(a) computing a cost for each conventional downlink channel according to a cost function that estimates a lack of communications quality expected from existing connections on each conventional downlink channel, if a given conventional downlink channel was assigned;

(b) assigning a conventional downlink channel by selecting a conventional downlink channel with a cost less than a prescribed cost level; and (c) selecting a uplink channel in accordance with existing rules of the communication system.

56. In a wireless communication system, the system including a base station and one or more subscriber stations, the base station including an array of antenna elements and SDMA processing means, a method for assignment of a full-duplex channel in which a duplex channel is selected from a set of duplex channels wherein each duplex channel of the set provides acceptable quality downlink and uplink communications, the method comprising:
   (a) computing a cost for each conventional duplex channel according to a cost function that is indicative of a lack of communications quality expected from existing connections on each conventional duplex channel, the cost function including spatial properties of the subscriber station; and
   (b) assigning a conventional duplex channel by selecting a conventional duplex channel with a cost less than a prescribed cost level.

57. A call admission control method, based on an interference cost function, for use in a wireless communication system for controlling admission of a connection for a new subscriber station, the system including a base station and one or more subscriber stations, the base station including an array of antenna elements and SDMA processing means, the method comprising:
   (a) evaluating a cost for a selected conventional channel according to a cost function that is indicative of the interference-plus-noise on the selected conventional channel if the selected conventional channel were to be assigned, the evaluation using spatial properties of the subscriber station for communicating with the base station;
   (b) comparing the cost with a prescribed channel assignment cost level; and
   (c) admitting the call if the cost is less than the prescribed channel assignment cost level.

58. A call admission control method for use in a wireless communication system for controlling admission of a connection for a new subscriber station, the system including a base station and one or more subscriber stations, the base station including an array of antenna elements and SDMA processing means, the method comprising:
   (a) predicting the received signal level and interference-plus-noise level on each conventional channel based upon a model of the wireless communication system for predicting a received signal level and interference-plus-noise level on each conventional channel based upon existing connections, if a given conventional channel was assigned for the new subscriber station;
   (b) selecting a conventional channel for the new subscriber station that has an acceptably high predicted signal-to-interference-plus-noise ratio (SINR) determined according to predicting step (a); and
   (c) admitting the call if the SINR is greater than a prescribed admission level SINR threshold value,
   the method further comprising the step of assigning a spatial channel for the call on the selected conventional channel if the communications system supports and the SDMA processing means enables communication on more than one spatial channel on the same conventional channel, and if the assigned conventional channel is in use by the base station for communicating with a second subscriber station on an existing spatial channel.

59. A call admission control method for use in a wireless communication system for controlling admission of a connection of a new subscriber station, the method, based on an estimate of existing system call load, comprising:
   (a) estimating the existing call load for indicating how much of the system capacity is being utilized;
   (b) prescribing a call load threshold that is indicative of a maximal call load allowed for the system; and
   (c) comparing the existing call load with the call load threshold; and
   (d) admitting a new call if the estimated existing call load is less than the call load threshold,
   wherein estimating step (a) further comprises monitoring the rate at which intracell handoffs occur, and estimating the existing call load from the rate at which intracell handoffs occur.

60. A call admission control method for use in a wireless communication system for controlling admission of a connection of a new subscriber station, the method, based on an estimate of existing system call load, comprising:
   (a) estimating the existing call load for indicating how much of the system capacity is being utilized;
   (b) prescribing a call load threshold that is indicative of a maximal call load allowed for the system; and
   (c) comparing the existing call load with the call load threshold; and
   (e) admitting a new call if the estimated existing call load is less than the call load threshold,
   wherein estimating step (a) further comprises estimating the existing call load by monitoring the rate of channel reassignments.

* * * * *